United States Patent [19]
Hanson

[11] Patent Number: 5,257,206
[45] Date of Patent: Oct. 26, 1993

[54] STATISTICAL PROCESS CONTROL FOR AIR SEPARATION PROCESS

[75] Inventor: Thomas C. Hanson, Buffalo, N.Y.

[73] Assignee: Praxair Technology, Inc., Danbury, Conn.

[21] Appl. No.: 663,595

[22] Filed: Apr. 8, 1991

[51] Int. Cl.$^5$ .............................................. G06F 15/20
[52] U.S. Cl. .................... 364/502; 364/148; 364/149; 364/150; 364/152
[58] Field of Search ............... 364/141, 148, 149, 150, 364/152, 469, 502

[56] References Cited

U.S. PATENT DOCUMENTS

| | | | |
|---|---|---|---|
| 2,994,646 | 8/1961 | Kleiss | 364/502 X |
| 3,221,151 | 11/1965 | Cattel et al. | 364/150 |
| 3,221,229 | 11/1965 | Kezer et al. | 364/150 X |
| 3,221,230 | 11/1965 | Osburn | 364/150 X |
| 3,534,400 | 10/1970 | Dahlin | 364/149 X |
| 3,543,010 | 11/1970 | Dahlin | 364/149 X |
| 3,735,599 | 5/1973 | Izumichi et al. | 65/13 X |
| 3,912,476 | 10/1975 | Mikawa et al. | 62/37 |
| 4,030,986 | 6/1977 | Shinskey | 203/2 |
| 4,035,620 | 7/1977 | Hobbs et al. | 364/181 |
| 4,125,004 | 11/1978 | Alshuk | 364/472 X |
| 4,251,248 | 2/1981 | Iyoki et al. | 62/21 |
| 4,316,255 | 2/1982 | Jensen | 364/501 |
| 4,380,206 | 4/1983 | Baitis et al. | 114/144 R X |
| 4,400,239 | 8/1983 | Hobbs | 196/132 |
| 4,734,114 | 3/1988 | Tasaka et al. | 62/37 |
| 4,838,913 | 6/1989 | Victor et al. | 62/24 X |
| 5,121,467 | 6/1992 | Skeirik | 395/11 |
| 5,150,289 | 9/1992 | Badavas | 364/148 X |

OTHER PUBLICATIONS

"Understand the Basics of Statistical Process Control" William Levinson—Chemical Engineering Progress; pp. 28-37; Nov. 1990.

"Improve Quality With Statistical Process Control" Steven R. Block—Chemical Engineering Progress; pp. 38-43; Nov. 1990.

"Watch Out For Nonnormal Distributions" David C. Jacobs; Chemical Engineering Progress; pp. 19-27; Nov. 1990.

*Primary Examiner*—Edward R. Cosimano
*Attorney, Agent, or Firm*—Frederick McCarthy; Chung K. Pak

[57] ABSTRACT

Statistical process control system for an air-separation plant using off-line and on-line computer means to define control chart limits, trend thresholds and dynamic models for use with on-line process variable data for determination of statistical process control.

11 Claims, 18 Drawing Sheets

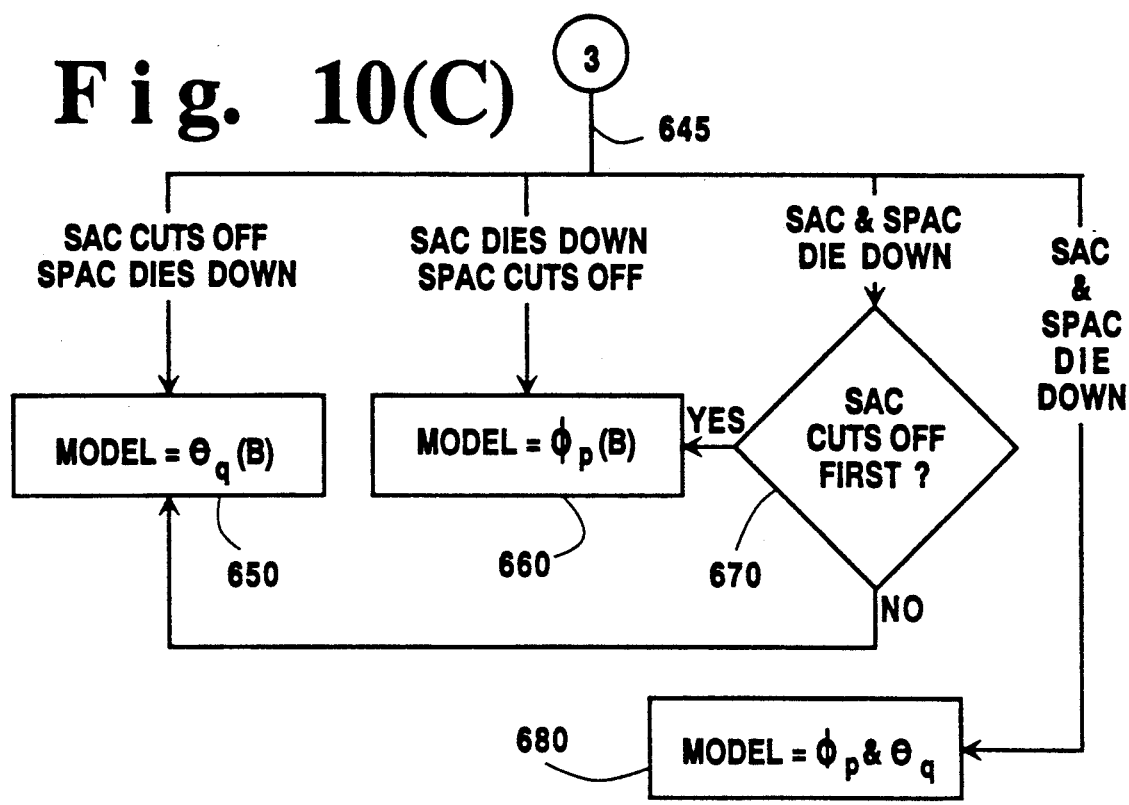
Fig. 10(C)
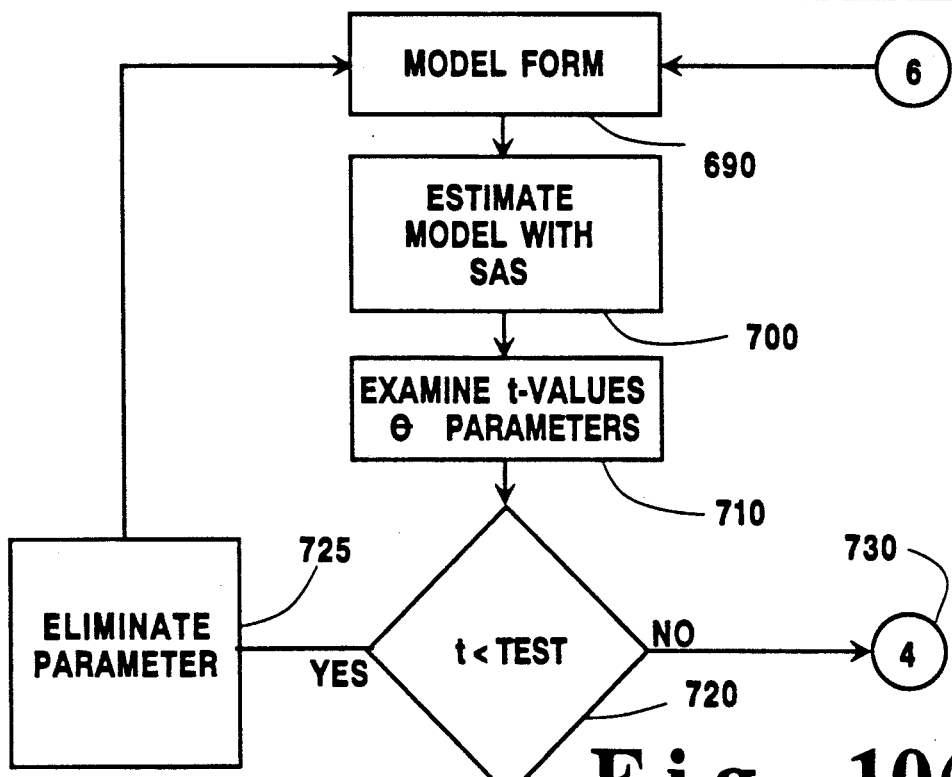
Fig. 10(C₁)

Fig. 12

| | |
|---|---|
| Tag Name ☐ — 1001 | Chart Type = ☐ — 1012 / 1014 |
| | Distribution = ☐ |
| | Mov Aug Size = ☐ — 1016 |
| Max Sample No. = ☐ (1002/1004) Observ Number = ☐ (1008/1010) | SET POINT ↑ ↓ — 1060 |
| Sample Interval = ☐ Observ Interv = ☐ | |

ARIMA Y / RESID N / TREND LAGS / ALPHA — 1050
Spec Limits   Ctrl Limits   U Xbar L   U S L — 1036
USL = ☐  CL/Sigma = ☐  ☐ — 1034
LSL = ☐  UCL / LCL = ☐  ☐ — 1040
1052 1020 1018  1026 1028 1032  Alfa U = ☐ — 1022
Alfa L = ☐ — 1024

Fig. 13

Tag Name  LOZ PUR — 1001'
Chart Type = z — 1012'/1014'
Distribution = z
Mov Aug Size = 1 — 1016'
Max Sample No. = 50   Observ Number = z
Sample Interval = 00:05   Observ Interv = 00:02
SET POINT ↑ ↓ — 1060

ARIMA Y / RESID N / TREND LAGS / ALPHA — 1050
Spec Limits   Ctrl Limits   U Xbar L   U S L — 1036
USL = 46.000  CL/Sigma =   — 1034
LSL = 34.000  UCL / LCL =   — 1040
1052 1020' 1018'  1026 1028 1032  Alfa U = 0.05000 — 1022'
Alfa L = 0.02500 — 1024'

Fig. 14

Tag Name  LOZ PUR — 1001'
Chart Type = z — 1012'/1014'
Distribution = z
Mov Aug Size = 1 — 1016'
Max Sample No. = 50   Observ Number = z
Sample Interval = 00:05   Observ Interv = 00:02
SET POINT ↑ ↓ — 1060

ARIMA Y / RESID N / TREND LAGS / ALPHA — 1050
Spec Limits   Ctrl Limits   U Xbar L   U S L — 1036'
USL = 46.000  CL/Sigma = 23.496  7.274 — 1034'
LSL = 34.000  UCL / LCL = 38.521  11,518  16.246  1.886 — 1040'
1052 1020' 1018'  1026 1028' 1032'  Alfa U = 0.05000 — 1022'
Alfa L = 0.02500 — 1024'

STATISTICAL PROCESS CONTROL FOR AIR SEPARATION PROCESS

FIELD OF THE INVENTION

The present invention relates to a system for establishing statistical process control for air-separation processes wherein feed air is separated to obtain its oxygen and nitrogen components.

BACKGROUND OF THE INVENTION

Statistical quality control techniques for manufacturing processes have been available for about 70 years, and have not been widely applied in American industry until very recently. Statistical process control (SPC) is a system or philosophy which pushes any manufacturing process to reduce variability down to its stable and inherent background level.

In the process industries, process control has a special meaning and is usually understood to mean the real-time automatic regulatory control and or supervisory control of the process. The need for control arises from the fact that there are inherent disturbances in any process. Control objectives in the process industries are typically directed toward maintaining regulatory control and achieving certain economics goals in the face of measured and unmeasurable disturbances within product quality Constraints. A product quality constraint is typically an inequality relationship in a Control algorithm, e.g., product B shall contain less than 1.7% of component A. When the control objective is product quality control, the constraint typically takes the form of a defined target value and tolerance about that target.

Conventional process control utilizes combinations of open-loop and closed-loop versions to achieve the control objectives for the process. Imperfect knowledge of the process and the various disturbances operating on the process means that any practical control system requires feedback of some sort to achieve a satisfactory level of control. The chief advantage of feedback is that it can compensate, at least in theory, for any and all types of disturbance. However, feedback action does not begin until an error is observed and therefor the control action lags behind the disturbance action according to the dynamics of the process.

Feedforward control will overcome the problem of response lagging the effect of a disturbance on the controlled variable if the disturbance can be measured. Proper feedforward action will prevent an error from occurring by manipulating the appropriate process variable when a disturbance is detected. However, advance knowledge of how the process will behave for each type of disturbance is required in order to have the correct direction and magnitude of adjustment. One must also identify all the possible types of disturbances in advance.

SPC on the other hand has as its goal, the minimization of variability in key product quality characteristics. SPC techniques can be used to control and adjust independent or manipulated variables in order to maintain consistency in a dependent or output variable but lack the advantage that knowledge of process dynamics and continuous time automatic control theory brings.

Incorporation of statistical thinking into real-time continuous process control then is the crux of the problem addressed by this invention. Specifically, the use of statistical techniques combined with existing control and monitoring technology to improve the overall performance of an air-separation process.

SUMMARY OF THE INVENTION

The present invention involves the electronic collecting of a large amount of process variable data values, for respective process variables of interest, from a continuously operating air-separation process and storing the collected data, initially obtained as continuous real-time analog measurements, in digitized form, in a file of an electronic data base which is interactive with on-line and off-line computer means under program control. Stored process variable data is manipulated by off-line computer means under program control, e.g., SAS, and also the entering of information into off-line computer means by operating personnel, to define data sample grouping, create histograms (frequency distribution), establish the distribution form of the data, establish computational formulas for calculating numerical values based on the data for sample statistics (including probability density function (PDF)), create control charts corresponding to the defined distribution form with control limits and center line and also create dynamic time series models for forecasting variable data all of which are stored in the data base for interaction with both on-line and off-line computer means. Subsequent to the installation of the foregoing in the data base, real time process variable data values for current air separation process operation is collected by continuous analog measurement and exported to and processed in digitized form by on-line computer means under program control, e.g. ONSPEC, and applied to the defined control chart with visually presented limits (for a predetermined level of Type I-(alpha) error) and alarm thresholds including trend alarm thresholds. Also, on-line computer means under program control computes and displays on the created chart the graph of the values of observations for a predetermined number of consecutive data samples to indicate whether or not there is statistical evidence of non-random behavior such as a trend or a shift in the real time measured process variable data.

Additionally, values of residuals of real time measured process variable data, i.e., difference between actual measured data sample values and value predicted by dynamic (ARIMA) model, are computed on-line and applied to a control chart created on-line, and the graph of the residuals is also computed on-line to indicate visually on the chart any non-random behavior of the residual time series.

Operating personnel, by observing the patterns in the graph of the actual observation values or residuals can see whether a trend exists which is either continuously increasing, or continually decreasing. In either case, when the trend behavior has persisted for a predetermined number of samples taken at equally spaced intervals the existence of non-random behavior in the time series for the particular process variable data is statistically established, and operating personnel are advised by a visual chart display to initiate investigation of this variation from statistical control and optionally a process control adjustment signal can be generated by the computer under process control.

As used herein the term "SAS" means a software system for statistical analysis with interfaces to other data bases and tools for statistical relationships, graphics and forecasting. It is a Trademark of SAS Institute, Cary, N.C.

As used herein the term "ONSPEC" means a program which permits manipulation of current data, graphs display, monitoring of alarm conditions and historical data analysis. It is a Trademark of Heuristics, Inc.

As used herein the term "ARIMA" means Autoregressive Integrated Moving Average.

BRIEF DESCRIPTION OF THE DRAWINGS

FIGS. 12, 13, 14 are exemplary CRT screens used in the practice of the present invention;

DETAILED DESCRIPTION

Figure 1:
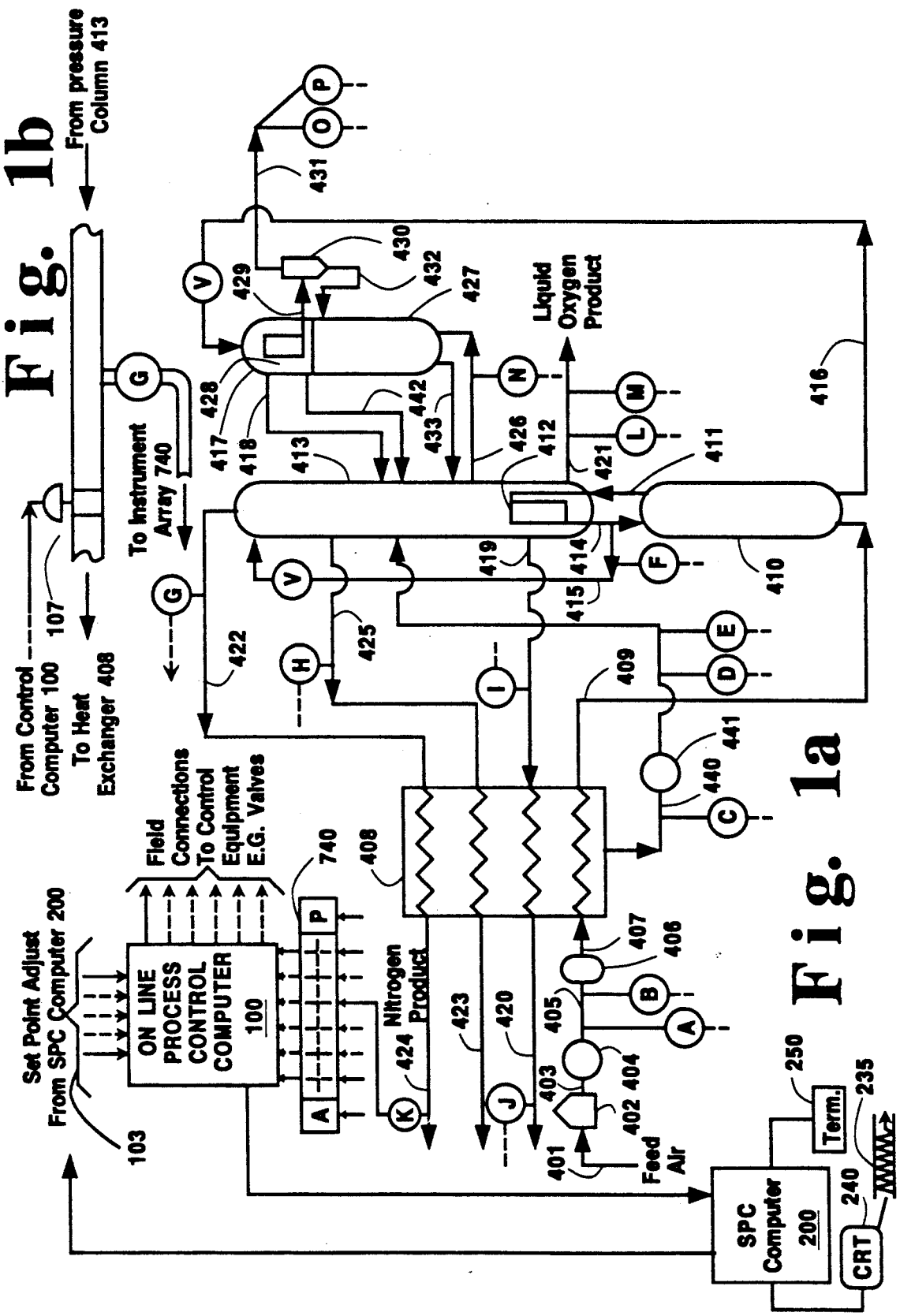
FIGS. 1a and 1b are diagrams involving a state-of-the-art commercial air separation plant and a statistical process control means.

With reference to FIGS. 1a and 1b, diagrams are shown for a statistical process control means and a state-of-the-art air separation plant in which feed air is cryogenically separated to provide high purity gaseous nitrogen product, high purity liquid and high purity gaseous oxygen product, and argon product.

A state-of-the-art air separation system, such as the type disclosed in U.S. Pat. No. 4,838,913 R. A. Victor, M. J. Lockett is illustrated in FIG. 1a and 1b.

Referring to FIG. 1a and 1b, feed air 401 is cleaned of dust and other particulate matter by passage through filter 402. Filtered feed air 403 is compressed by passage through compressor 404 to a pressure generally within the range of from 70 to 170 psia. Compressed feed air 405 is then cleaned of high boiling impurities such as water, carbon dioxide and hydrocarbons, by passage through purifier 406. Cleaned, compressed feed air 407 is cooled to near liquifaction temperature by indirect heat exchange in heat exchanger 408 with product and waste streams from the columns. Cleaned, compressed and cooled feed air 409 is then introduced into first column 410 which is the higher pressure column of a double rectification column plant. Column 410 generally is operating at a pressure within the range of from 50 to 150 psia. A minor fraction 440 of the feed air is withdrawn from the middle of heat exchanger 408, expanded in turbine 441 and introduced into lower pressure column 413 at a point below the nitrogen withdrawal points but above the argon column feed withdrawal point.

Within column 410 the feed air is separated by rectification into nitrogen-rich vapor and oxygen enriched liquid. Nitrogen rich vapor 411 is passed through conduit means from column 410 to main condenser 412, which is preferably within second column 413, which is the lower pressure column of the double column rectification plant. Main condenser 412 may also be physically located outside the walls of column 413. Within main condenser 412 nitrogen rich vapor 411 is condensed by indirect heat exchange with reboiling column 413 bottom liquid. Resulting nitrogen rich liquid 414 is passed through conduit means to column 410 as reflux. A portion 415 of he resulting nitrogen-rich liquid, generally within the range of from 20 to 50 percent, is passed into column 413 at or near the top of the column.

Oxygen enriched liquid 416 is removed from the first column 410 and passed into argon column top condenser 417 wherein it is partially vaporized by indirect heat exchange with argon column top vapor. Resulting vapor and liquid are passed into column 413 as streams 418 and 442 respectively at points below the nitrogen withdrawal points but above the argon column feed withdrawal point.

Second column 413 operates at a pressure less than that of first column 410 and generally within the range of from 12 to 30 psia. Within second column 413 the fluids introduced into the column are separated by rectification into nitrogen-rich and oxygen rich components which are recovered respectively as nitrogen and oxygen products. Oxygen product may be recovered as gas and/or liquid having a purity generally exceeding about 99 percent. Gaseous oxygen product is removed from second column 413 at a point above main condenser 412, passed as stream 419 through heat exchanger 408, and recovered as stream 420. Liquid oxygen product is removed from second column 413 at or below main condenser 412 and recovered as stream 421. Nitrogen product, having a purity generally exceeding about 99.9 percent, is removed from the top of second column 413, passed through heat exchange 408 and recovered as stream 424. The pressure of stream 422 as it is removed from second column 413 is preferably as low as possible but sufficiently higher than atmospheric pressure so as to ensure passage of nitrogen product out of the plant without need for auxiliary pumping. Waste nitrogen stream 425, necessary for proper operation of the separation system, is also removed from second column 413, passed through heat exchanger 408 and vented as stream 423. Stream 425 is taken from second column 413 at a point below the point where nitrogen stream 415 is introduced into the column.

The state-of-the-art air separation system of FIG. 1a and 1b further comprises recovery of crude argon. Referring back to the FIG. 1a and 1b, a vapor stream 426 is withdrawn from an intermediate point of second column 413 where the argon concentration is at or close to a maximum, generally about 10 to 12 percent. Stream 426 is passed into and up third, or argon, column 427, operatinq at a pressure within the range of from 12 to 30 psia, wherein it becomes progressively enriched in argon by countercurrent flow against descending liquid. Argon enriched vapor 428 is passed from argon column 427 to top condenser 417 wherein it is partially condensed by indirect heat exchange with partially vaporizing oxygen-enriched liquid 416. Resulting partially condensed argon-enriched fluid 429 is passed to separator 430. Argon rich vapor 431 is recovered from separator 430 as crude argon product having an argon concentration generally exceeding 96 percent while liquid 432 is passe from separator 430 into argon column 427 as descending liquid. Liquid accumulating at the bottom of argon column 427, having an oxygen concentration exceeding that of stream 426 is passed as stream 433 into second column 413.

An on-line process computer 100 receives data from instrument array 740 in FIG. 1b and calculates or maintains set-points for closed loop process control equipment in accordance with widely known techniques by comparing measured data with pre-determined and set reference target values. The effectiveness of set point determination is enhanced when the measured process variables are in statistical control i.e. the measured quality characteristic has a time-invariant distribution, it is consistent and hence predictable. A significant increase in common cause variation for a process variable, or the occurrence of special cause, or assignable cause variation, for a process variable can seriously degrade the performance of a process control system. In the event of significant common cause or occurrence of special cause variation, indicating the absence of statistical control for real time process variable data exported to SPC computer 200 from on-line process controller 100, as hereinafter more fully described, a set point adjustment signal from SPC (Statistical Process Control) computer 200 is applied at 103 to the on-line process control computer 100 to effect a change in the set point for a particular control element e.g. control valve 107, to increase or decrease flow therethrough in accordance with the process control strategy in response to a determination of non-random behavior for data samples of product nitrogen purity taken at location G of FIG. 1.

Typical process variables for an air separation plant of the type illustrated in FIG. 1 are sampled at the locations A-P shown in FIG. 1. The identification of these process variables are listed below:
A:Feed Air Flow
B:Feed Air Temperature
C:Turbine Inlet Temperature
D:Turbine Discharge Temperature
E:Turbine Flow
F:Column Liquid Reflux Purity
G:Product Nitrogen Purity
H:Waste Nitrogen Purity
I:Product Oxygen Purity
J:Product Oxygen Flow
K:Product Nitrogen Purity
L:Liquid Oxygen Purity
M:Liquid Oxygen Flow
N:Argon Column Feed Purity
O:Crude Argon Product Purity
P:Crude Argon Product Flow With reference to FIG. 2, which shows a diagram of a system in accordance with the present invention, "on-line" process control computer 100, e.g. Data General Nova S-10, receives instrumentation data gathered from an air separation process as shown in FIG. 1 to establish an historical data base for respective process variables, e.g. items A-P noted herein above. The gathered data is real-time process variable data related to continuous operation of the production process e.g. Feed In Flow (feedstock flow rate), Liquid oxygen purity (product purity), and is obtained as data samples at pre-determined sampling intervals in accordance with state-of-the-art techniques. The process control computer 100 also utilizes the sampled data to maintain, or establish new set points, and for control of the process in accordance with the desired process control strategy which is embodied in the program control of the process control computer 100 in accordance with conventional state-of-the-art procedures. For purposes of the present invention, analog signals 253 are all sent to control computer 100 where they are converted to digital form. Computer 100 exports the digital data to computer 120 via archive files or in real time using an appropriate commercially available driver software, e.g. Gould Modbus and stored electronically in historical data file 140 to establish a large data bank for each measured process variable. For air separation plants historical data is typically acquired for two or three sets of contiguous 24 hour periods of data, for each variable of interest, for each major operating mode of the process. The historical data for each variable, e.g. items A-P listed hereinabove, is separately analyzed, in the off-line computer 120 to establish, for each such variable, the measurements of the variables, the statistical characteristics for the variable, e.g. the nature of the distribution of the measurements of the variables including a determination of the probability density function, PDF, the degree of auto-correlation, relative dynamic behavior; also, models are developed at off-line computer 120, e.g. based on standard differential equation techniques, and also ARIMA models (Auto Regressive Integrated Moving Averages), using a standard statistical software e.g. SAS (Statistical Analysis System) which is also used to generate histograms and descriptive statistics for data sets.

For each particular variable a sampling interval, sub-grouping, and an indication of the data distribution form can be established by SPC operational personnel on the basis of observation and experience, or with assistance from off-line computer 120 using appropriate commercially available software, e.g. SAS, and the information is entered into "set up" data base 160 e.g. ONSPEC and in the memory 180 of SPC (Statistical Process Control) processor 200 IBM PS-2. Historical data of a variable from data file 140 is processed in off-line computer 120 (or by SPC processor 200) to develop limits and alarms for the detection of special cause variation during process operation, e.g. trend detection criteria for a pre-determined number of consecutive process variable data points which forecast the imminent occurrence of an unacceptable level of special cause variation; in such event alarm signals 245 are generated by SPC computer 200. Histograms and standard statistical techniques are used with SAS or other similar software in off-line computer 120 to establish trend alarm criteria which are entered into "set-up" data base 160 and the memory 180 of SPC processor 200. From analysis of histogram presentations generated by off-line computer 120 using SAS software, for example, an estimation of the distribution form of historical data for a particular variable is made, and using this information a specific, conventional control chart type is designated, e.g. $\overline{X}$, S, EWMA, CUSUM and chart control limits for a predetermined Type I-alpha-error (confidence level) are generated by off-line computer 120, e.g. using SAS software (or alternatively, on-line, using data in circular history files), and this information is stored in "set-up" data base 160 for use by SPC processor 200 in the generation of chart displays 220 at printer 230. Visual displays 235 of charts, histograms and other graphics are presented at CRT 240 including those generated by off-line computer 120 and by SPC processor 200 using on-line variable data. Adjustment and editing of the visual displays is accomplished at keyboard terminal 250. With the foregoing parameters established, SPC processor 200 receives on-line, real time variable data from on line process control computer 100 which is presented on the created control charts, and alarm indications are monitored and signals provided based on such charts and alarms as hereinafter more fully described.

Figure 2:
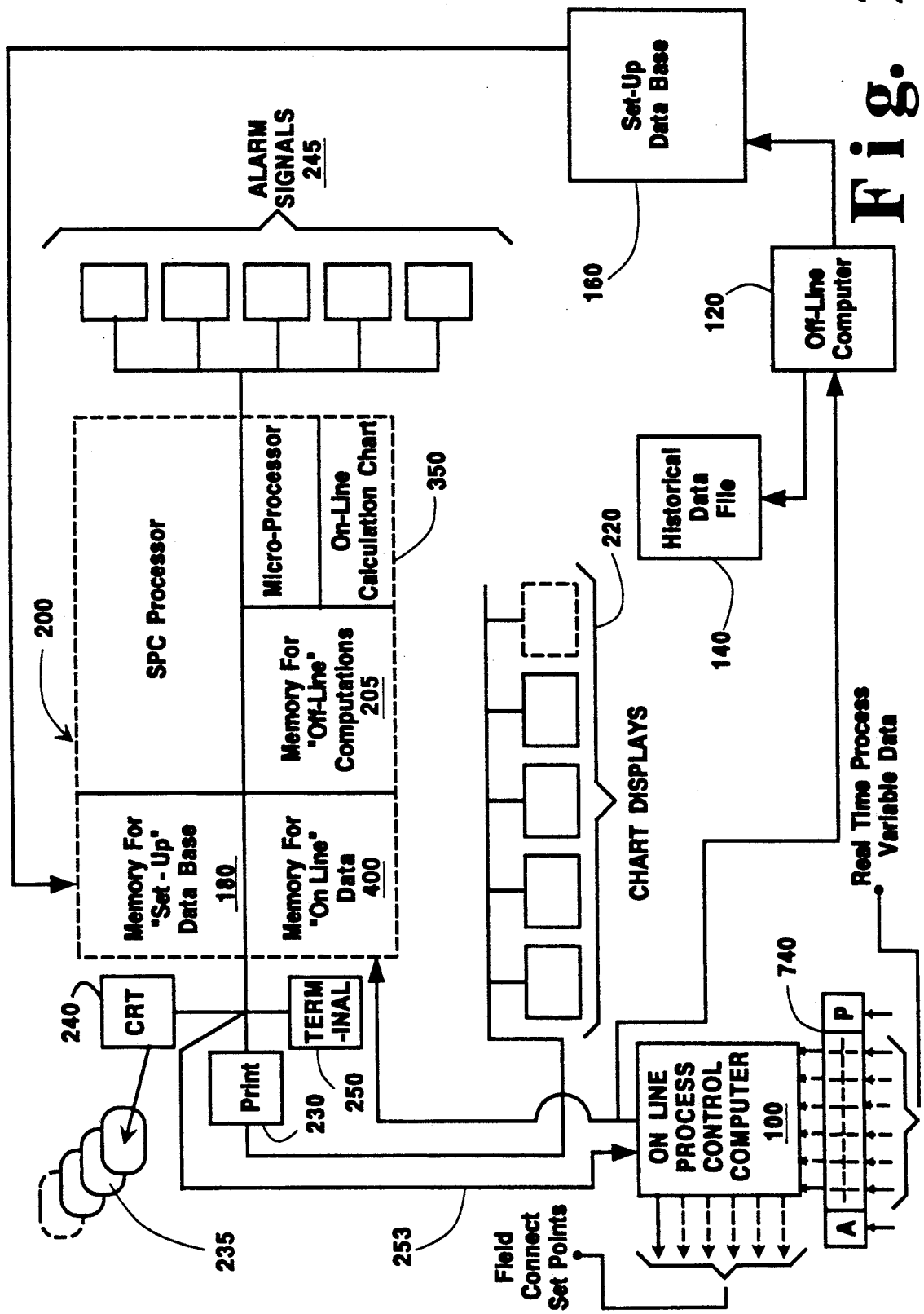
FIG. 2 is a block diagram and flow chart of a system in accordance with the present invention.
Figure 3:
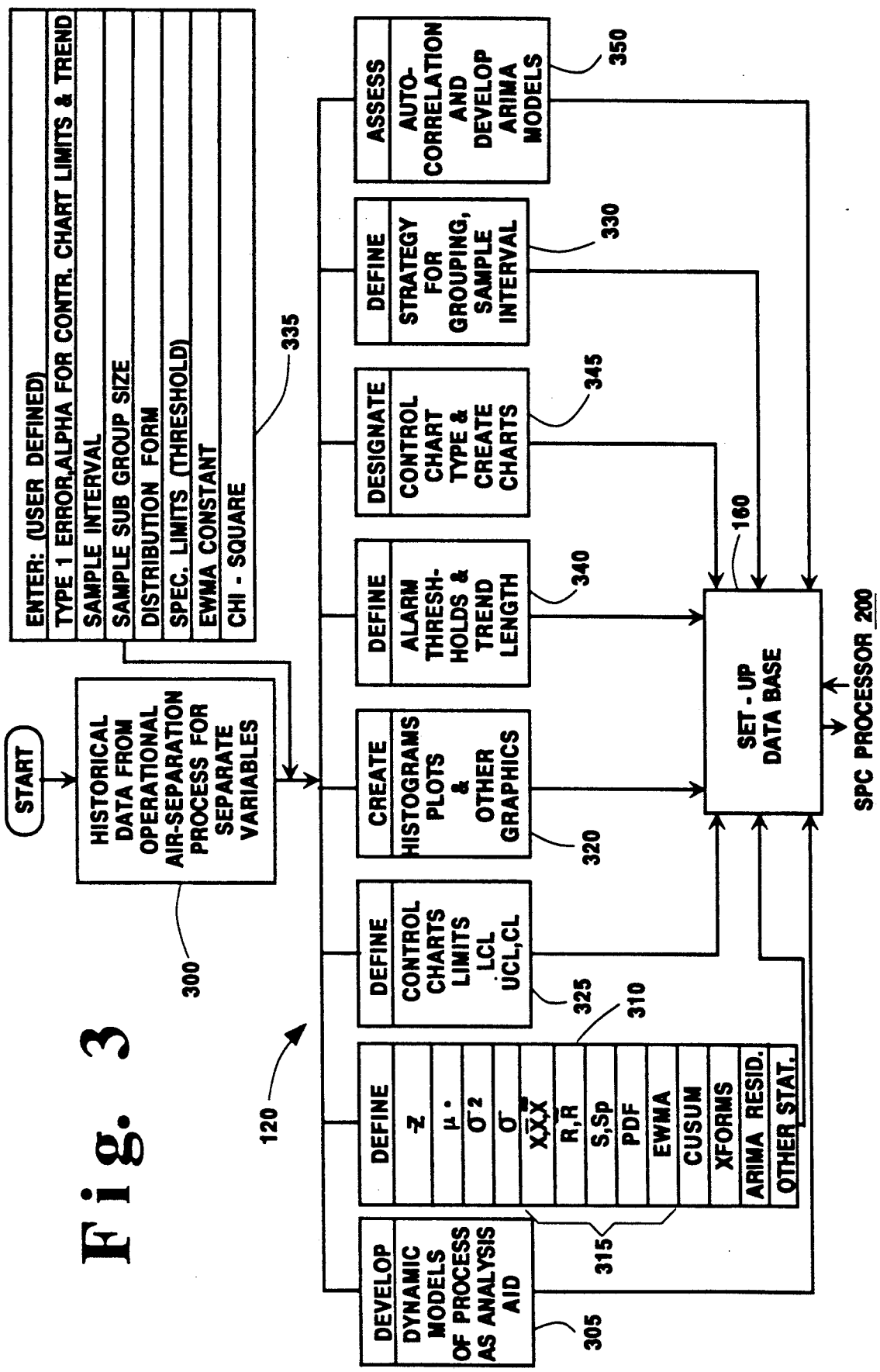
FIG. 3 is a flow chart for the structuring of a data base for use in the present invention.

With reference to the flow-chart of FIG. 3, historical data from an operational air separation process, such as illustrated in FIG. 1, is separately, electronically provided at 300 for each individual process variable of interest, e.g. items A-P listed hereinabove, suitably from archived computer memory files, e.g. disks, or from on-line instrumentation for current process operation. For each variable it is customary to obtain from one to three sets of contiguous 24 hours periods in each major mode of operation in order to obtain a large amount of data which is representative of the variable when in statistical control. This large amount of data, for each separate variable, is processed in the off-line computer 120 (FIGS. 1 and 2) using a standard statistical software, such as SAS, to provide, as previously noted, a data base 400 for utilization by SPC processor 200 (FIGS. 1 and 2). The data may at times be alternatively and advantageously processed on the SPC computer 200. In creating the data base 400 (shown also in FIG. 2), relationships such as indicated at 310 are defined by the conventional software (and are also listed in Appendix A which is provided in the Patent Office file). Histograms, based on the historical data, showing a graphical presentation of a frequency distribution of a particular variable e.g. item L—Oxygen Product Purity ($LO_2$) are created at 320 by the off-line computer 120 under program control such as exemplarily illustrated in FIG. 4. From the frequency distribution of the histogram of FIG. 4, the type of distribution for the particular variable, e.g. "$LO_2$", can be derived and displayed by the program control at 345, in this case log normal as shown in FIG. 5. Based on the estimated or calculated time response of the process, a sampling interval for the particular variable and information to assist in grouping of data can be generated by the off-line computer at 330 or the sampling interval, grouping and distribution type can be determined by SPC user personnel from observation of the histogram and entered by SPC user personnel at 335. In off-line analysis, Fortran based dynamic models 305 are available to predict a time response for a process variable which then suggests an appropriate estimate of sample rate and subgroup strategy, e.g., the shorter the time response the more frequent the sampling.

The nature of the distribution of measurements for a given variable is studied off-line (and can be studied on-line) using histograms such as above described. Histograms are automatically generated for the data for each process variable that has been archived in data base 160(or built up from data being gathered by process control computer 100 in on-line operation in real time). For some variables the distribution (form) is determinable by persons skilled in the art from fundamental considerations known to the art, and knowledge of the process, and can be set accordingly at 335 of FIG. 3 by operator personnel.

With air separation processes of the type described hereinabove a very substantial amount of data is available over short time periods with respect to the dominant time constants of the process, and subgrouping of the data is frequently applied. Since measurements in the process industry have a reputation for being noisy, subgrouping is an appropriate technique for "averaging out" noise.

Sample size for a subgroup is a function of process dynamics, ease and cost of data acquisition, and the variability inherent in the measurement process. Control theory suggests that the interval between subgroups be rather small compared to the system time constants, which means that not much process change should take place between samples; consideration is also given to dynamic effects in the measurement equipment since sampling at an interval less than the time constant of the measurement device will introduce auto-correlation not due to the process. A good value for sampling interval can be achieved by a study of the process dynamics and examination of generated histograms. With data acquisition automated, e.g. by process control computer 100, it is generally better to handle as many samples per subgroup as feasible. Typical subgroupings that work well for air-separation processes described hereinabove range from 3 to 9 values taken 1-2 minutes apart; the time between sub-groups can be 0 to 10 minutes or more. Subgroup statistic calculations shown at 315 of FIG. 3 are made using raw data and the appropriate statistical formulae, with the associated tuning constants indicated at 335. Each of the subgroup statistics is suitably made available for use in a real time graphic display (e.g. at CRT 240 of FIG. 1), as well as archived for historical purposes in data file 40. In addition, these statistics are suitably made available for export to and adjustment from FORTRAN or "C" language subroutines within other application programs in the ON-SPEC environment.

Figure 6:
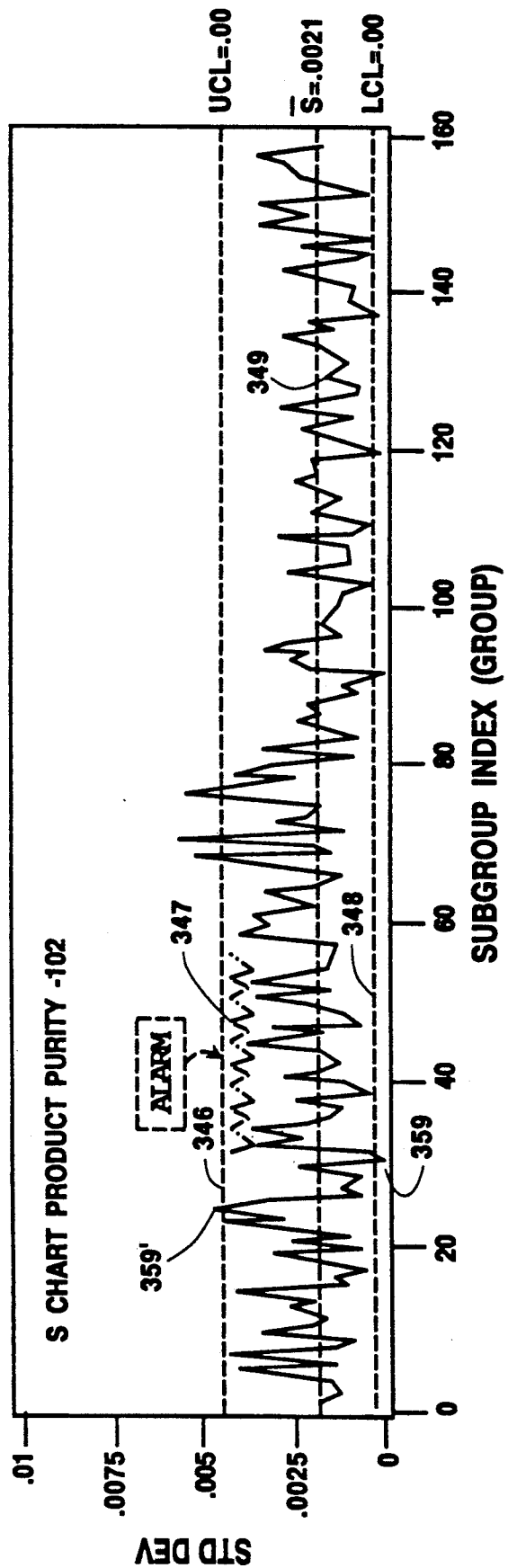
FIG. 6 shows an example of a control chart created in the course of practicing the present invention.
Figure 7:
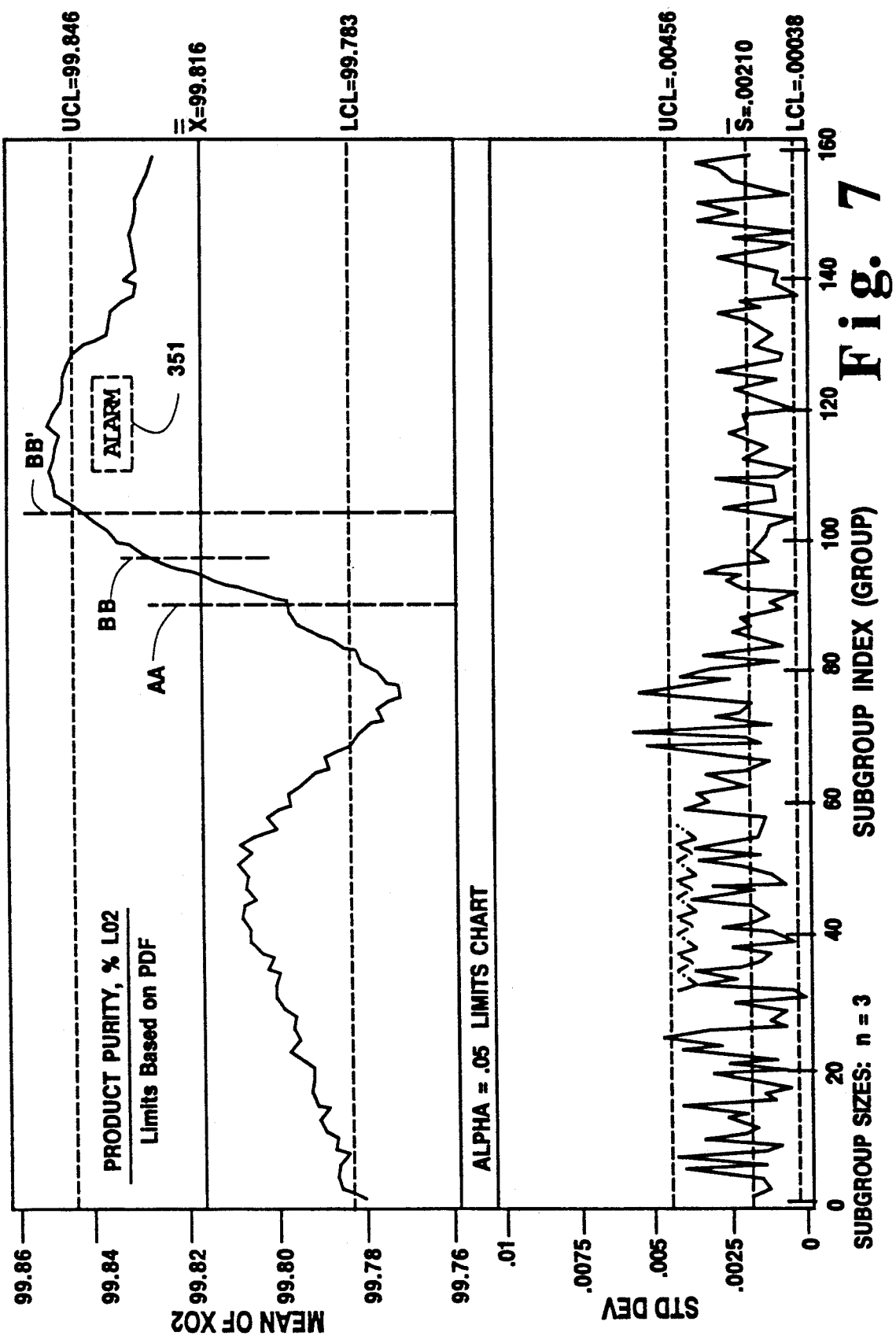
FIG. 7 is an example of a control chart with control limits based on probability density function.

Determination of the distribution type, e.g. normal, log normal, binormal, poison, general, and the probability density function (PDF) by computer analysis and calculation at 310, 320, 325, 330 and 40, or user designation at 335, will result in the creation of an appropriate control chart, as designated by SPC personnel, by computer 120 or 200 under program control, e.g. SAS, such as the "S" chart illustrated exemplarily in FIG. 6 and the "$\overline{X}$" chart of FIG. 7.

The creation of such a chart is based on the premise that a process in statistical control generates data that follows a distribution that is stable over time and that the histogram data set can be empirically modeled using standard statistical techniques, or fitted to a predetermined known analytical distribution, which for air separation plants such as illustrated in FIG. 1, is most often not a normal distribution. Thus, in accordance with the present invention, the associated probability density function (PDF), 310, is used in the calculation of control limits for a desired, designated level of Type I (alpha) error, 335, using standard statistical techniques (e.g. "Probability and Statistics for Engineers and Scientists," 4th ed., by Ronald E. Walpole and Raymond H. Myers; chapters 2 and 8, implemented in off-line compute 120 under program control). In this approach common-cause variation is defined by the distribution of subgroup averages. Data used to develop the distribution is taken when the process is under closed-loop automatic control for those variables within loops and over integer multiples of the period of known major cyclic disturbances. Cyclic disturbances may be induced by diurnal variations in ambient conditions, controller cycling due to imperfections in hardware, tuning and response time within other portions of the process. An exemplary control chart via this technique is shown in FIG. 6 as noted above.

In the creation of control chart limits samples are required from a process that is in statistical control while control chart limits are needed to determine if the process is in control, i.e. a bootstrapping situation. It can be assumed that the first "n" subgroups are in control and proceed with a calculation of control chart limits on this basis. Then, the subgroups used to create the first set of limits are examined to determine if they are indeed in control. Groups that are outside the initially determined limits are removed by editing and new control chart limits calculations are made and the procedure is iteratively repeated until the limits and data reflect statistical control. A fairly large amount of available initial data is important to insure that a statistically valid sample size remains after the iterative "editing" procedure has converged. In some cases it may be evident from the data at hand that the process was strictly out of control. Examination of the overall process may reveal the reason for this problem, e.g. a temporary valve actuator failure. New data must be gathered after the process has been repaired or modified.

Control limits, UCL (upper control limit), LCL (lower control limit), applicable to the determined statistical distribution e.g. normal, log normal, etc. are calculated at 310 by off-line computer 120 under program control for the particular historical variable data and a Type I (alpha) error and are applied to the control chart as illustrated exemplarily at 349, 346, 348 in FIGS. 6 and 7. Standard techniques for determining control limits are shown in a Praxair, Inc. literature entitled "Examples for the SPC treatment of the variable liquid oxygen purity from raw data through the development of an ARIMA model" which is provided to the Patent Office file and herein incorporated by reference.

In the practice of the present invention, the trend of the on-line, measured values of samples of a process variable in statistical control is analyzed to determine whether consecutive samples either progressively increase (approach UCL), or progressively decrease (approach LCL), for a specific number of trend lengths i.e. sampling intervals. If such is the case, indicating that the process variable may exceed a specified limit and is no longer in statistical control an alarm condition exists and a visual, audible tone warning, or other type signal or display is generated by the SPC computer 200 under program control. For example, a message is printed on a chart (351 in FIG. 7), the CRT (240 in FIGS. 1 and 2) display of the SPC computer highlights the trending data, and a pre-recorded voice warning is announced at the SPC computer.

Figure 8:
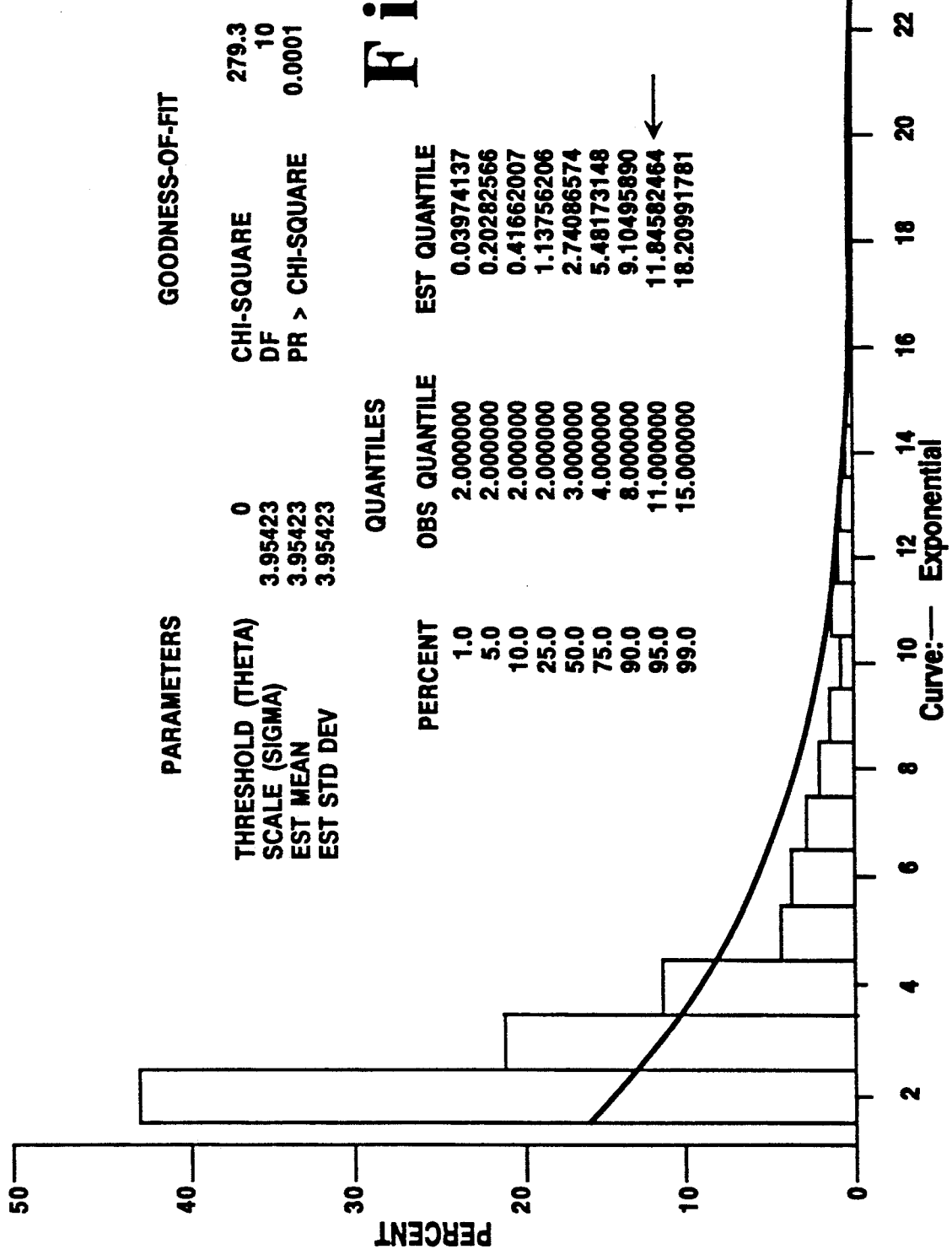
FIG. 8 shows the distribution of trend lengths for a particular process variable.

For example, with reference to the $\bar{X}$ chart of real time process variable data of FIG. 7, between the locations AA and BB there are ten consecutive samples (with (9) trend lengths or intervals) in an upward trend wherein each successive sample is more in value than the previous value. In the present invention the lengths for this trend (of successive increasing values) are counted and analyzed on-line by the SPC computer 200 under program control to determine whether the number of lengths of the trend have exceeded a threshold number of lengths (determined for a designated alpha error-degree of confidence). The trend alarm threshold defined in number of trend lengths (340 in FIG. 3) for a particular process variable is based on historical data for the particular process variable, suitably and preferably the same set of data (300 in FIG. 3) used in the determination of the control chart limits, and which is stored in set-up data base 160 (FIGS. 2 and 3). A histogram (frequency distribution) of the length of trends for the historical data is generated by SPC computer 200, similarly as the process variable data, as illustrated in FIG. 8, which exhibits an exponential distribution. A probability density function (PDF) for the distribution of trend lengths for the data in FIG. 7 is calculated by SPC computer 200 and alarm threshold limits are calculated, for example using the Quantile Technique for a designated Type I (alpha) error (degree of confidence) e.g. alpha=0.05, and a trend length for this alpha value is determined by integration of the PDF as shown in the text on FIG. 8.

These trend lengths 11.8, rounded to 12, represent the threshold level of the trend of the particular process variable and is stored in set-up data base 160. Thus for the situation shown in FIG. 7 ("10" trend lengths from AA-BB) the alarm threshold of "12" was not reached (which can readily be seen from FIG. 7) and no alarm was displayed. However, (12) successively increasing trend lengths occur between AA and BB' and for such a situation a trend alarm signal would be generated at sample time BB' indicating that the particular process variable is no longer in statistical control. In such a situation the set point at process control computer 100 (FIG. 2) can be adjusted by a signal at 253 from SPC computer 200 either automatically or in response to actuation of set-point control 1060 (FIG. 12) by SPC operating personnel at terminal 250 (FIG. 1).

In addition to the foregoing, time series modeling techniques (ARIMA) are utilized to provide a discrete dynamic model for forecasting and predicting variability of the data for some of the respective process variables which exhibit autocorrelation. The ARIMA model (350 of FIG. 3) is created as hereinafter described and stored in set-up data base 160 and the residual, i.e. the difference between the model-predicted value of the particular variable, and the actual value, is calculated on-line in SPC processor 200, at 350 (FIG. 2) and limits applied to the control chart (premised on a standard distribution for the ARIMA model) also generated on-line, based on the stored ARIMA model which is automatically retrieved from data base 400 based on the data processing frequency of the system.

ARIMA (Autoregressive Integrated Moving Average) is a time series model form useful for forecasting and control of many real variables. The model is of the general form ARIMA (p,d,q):

$$W_t = \delta + \phi_1 W_{t-1} + \phi_2 W_{t-2} + \ldots + \phi_p W_{t-p} + a_t - \theta_1 a_{t-1} - \theta_2 a_{t-2} - \ldots - \theta_q a_{t-q}$$

where
$W_t$ = value of time series variable at lag t
$\delta$ = Constant bias term
$\phi_i$ = Model coefficients for autoregressive terms
$\theta_j$ = Model coefficients for noise terms
$a_t$ = Random shock, sampled from a normal distribution with mean O and standard deviation $\sigma_a$ The variable $W_t$ may be the result of differencing of the raw time series values $X_t$, with the degree of differencing given by d, i.e., for d=1, $W_t = X_t - X_{t-1}$. The parameters, d, $\delta$ $\phi_i$, $\theta_j$ are all adjustable by the user and are suitably computer at off-line computer 120 using a time series application of SAS (maximum likelihood estimation) program. The parameters are stored in memory 205 (FIG. 2).

The SPC application makes use of the ARIMA model to analyze the data for a process variable with auto-correlation removed by considering the residuals formed from the difference between the model prediction and the observed value, ($\hat{W}_t - W_t$). The residuals are computed at computer 200 using ONSPEC and are computed with a C-program external to the ONSPEC and interfaced with it. Predicted values $W_t$ are found from $$\hat{W}_{t+1}\delta + \phi_1 W_{t+1-1} + \cdots + \theta_p W_{t+1-p} - \theta_1 \hat{a}_{t+1-1} - \cdots \theta_q a_{t+1-q} + a_{t+1}$$

The values $\hat{a}_j$ cannot be observed but can be shown to be $$\hat{a}_j = (\hat{W}_j - W_j), j = t-1, t-2, \ldots, t-q$$

Thus the $\hat{a}_j$ are estimated from past residuals of the model. An appropriate check for common cause or special cause variation would be a conventional Shewhart individuals control chart for the residual value at each time interval.

Application of ARIMA time series analysis involves three major steps:
model identification
model estimation
diagnostic checking.

Techniques for implementing each of these steps are given in "Time Series Analysis: forecasting and control" by George E. P. Box and Gwilym M. Jenkins, revised edition, 1976. A discussion of the relationship between conventional SPC, chemical process control, and time series analysis is given in "On-Line Statistical Process Control," CEP, October 1988 by John F. MacGregor.

Time-series models (ARIMA) are forecasting models and are used to predict variable values over moderate ranges. Predictability in the spirit of SPC (statistical process control) in the present context is the ongoing validity of the ARIMA time series model. The ARIMA time series model uses as a starting point an ensemble of time-ordered observations generated by the air separation process. ARIMA time series modeling serves as the basis for a statistically based prediction of where the process should be, based on where it has been. The time series model will appropriately consider the nature of the statistical dependence (auto-correlation) between observations.

The hypothesis that a model, e.g. the ARIMA time series model adequately represents the behavior of the variable at any time, requires testing. Statistical process control is evidenced by a time series of residuals formed from actual observations of process performance minus the predicted value which is a white noise sequence of independent, normally distributed values. The properties of ARIMA have been described by G. E. Box in the reference noted above. Model identification is an off-line computer analysis at off-line computer 120. The first step is to select a group of historical process variable data gathered at intervals appropriate with respect to process dynamics and the period of any characteristic periodic disturbances. It is generally preferred to take data in groups of 24 consecutive hours to include the effects of diurnal variation, shift changes, process loading, etc. During the data acquisition period the process should be operating in its normal fashion.

Qualitative inspection of histograms generated from the historical data for the selected variables are made to ascertain that the process appears to be operating typically. It is also useful to generate a PDF-based control chart for the variable data ensemble to obtain some quantative notion of the variation present in the process during the historical data acquisition time horizon. Editing of the data set to remove observations which would be deemed "out of control" in the conventional SPC sense is not done however. An accurate ARIMA representation depends on a continuous record of the process sampled at equal spaced intervals so that deleting data would remove information important to the determination of the dynamic characteristics of the process.

A general stationarity transformation is attempted at this stage, possibly in conjunction with a pre-differencing transformation, in order to provide a stationary series for the estimation of an ARIMA model. In its most general form as described by Bruce L. Bowerman and Richard T. O'Connell in "Time Series Forecasting, Unified Concepts and Computer Implementation," 2nd ed., the transformation is:

$$Z_t = \nabla_L^D \nabla^D Y_t^* = (1-B^L)^D (1-B)^d Y_t^*$$

wherein $Y_t^*$ are the series values after the appropriate pre-differencing transformation and B is the shift operator where $B^n X_t = X_{t-n}$.

A model is tentatively identified by examining the behavior of the sample auto-correlation (SAC) and partial auto-correlation (SPAC) functions and comparing them with known theoretical forms, as described by Box and Jenkins and Bowerman and O'Connell in "Time Series Forecasting, Unified Concepts and Computer Implementation," 2nd ed. The differencing transformations and generation of the SAC and SPAC functions is accomplished in off-line computer 120 under program control e.g. commercial statistical software such as SAS.

Model estimation is performed using SAS or equivalent time-series modeling software, as is the diagnostic checking and model improvement step.

At this point, an ARIMA model for the process variable of interest is fully defined. An example of such a model is

| $[1 - \phi_1 B - \phi_4 B^4 - \phi_5 B^5] \nabla y_t =$ | |
| $[1 - \theta_1 B - \theta_2 B^2 - \theta_5 B^5 - \theta_6 B^6] a_t$ | |
| $\phi_1 = 1.12518$ | $\theta_1 = 1.24896$ |
| $\phi_4 = 0.008891$ | $\theta_2 = 0.244529$ |
| $\phi_5 = 0.167527$ | $\theta_5 = 0.113064$ |
| | $\theta_6 = 0.103145$ |

This model is used in its difference form to predict the value of $Y_t$ at the next sampling instant, i.e.

$$\hat{Y}_t(1) = (1+\phi_1)Y_t - \phi_1 Y_{t-1} + \phi_4 Y_{t-3} -$$

$$(\phi_4 - \phi_5)Y_{t-4} - \phi_5 Y_{t-5} - \theta_1 a_t -$$

$$\theta_2 a_{t-1} - \theta_5 a_{t-4} - \theta_6 a_{t-5}$$

Figure 9:
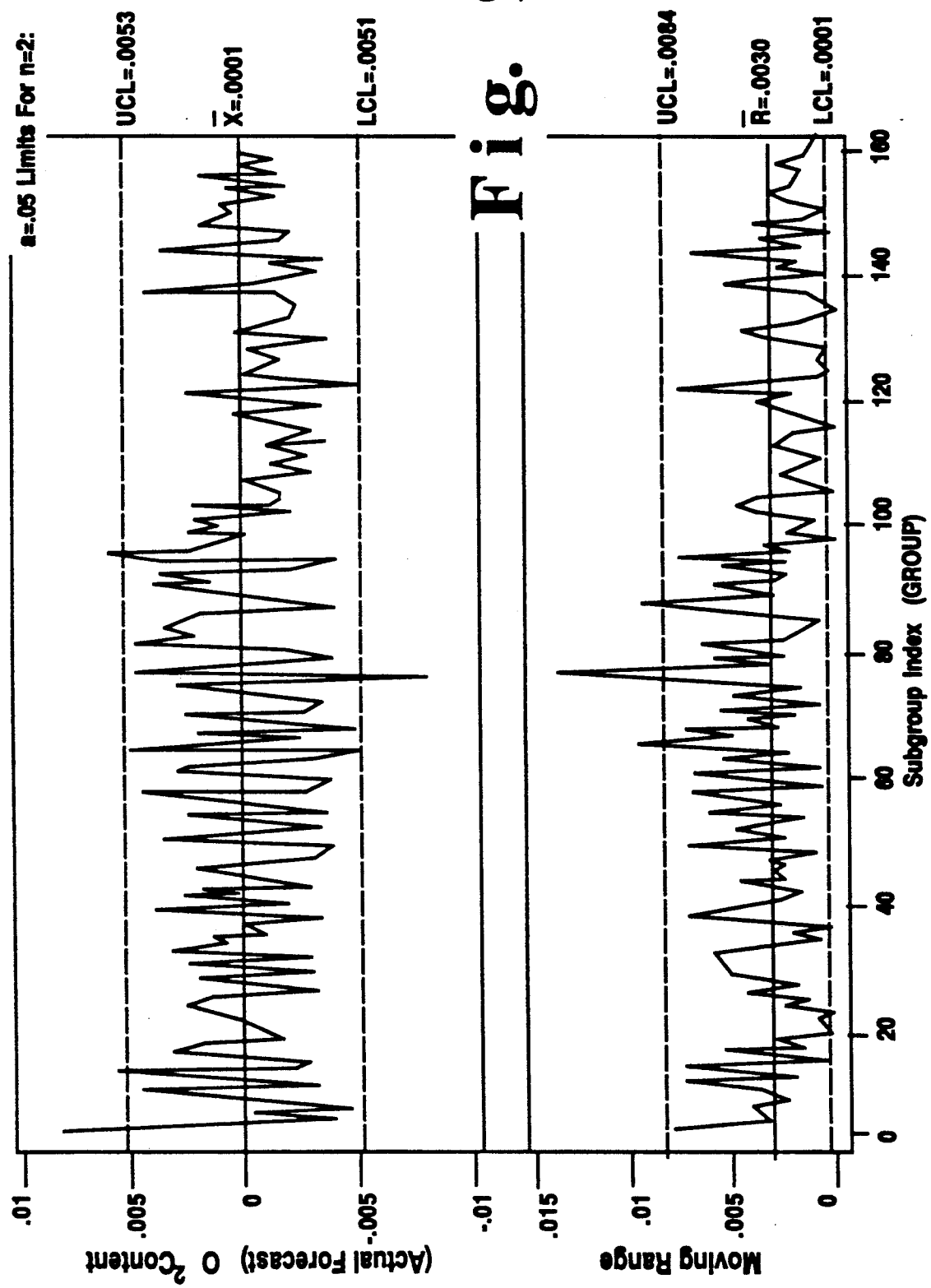
FIG. 9 is an example of residuals plotted on an ARIMA based control chart.
Figure 10A:
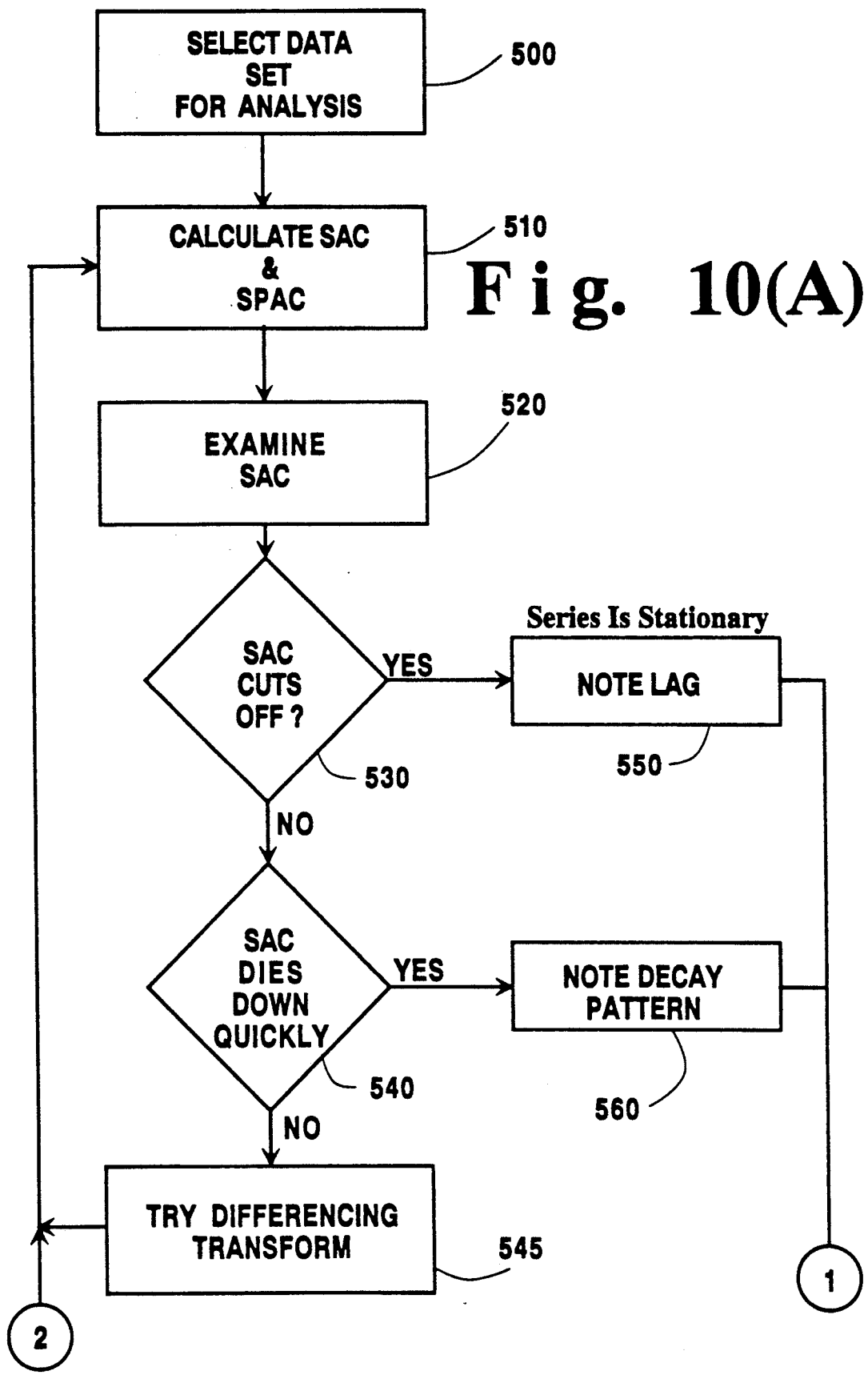
FIGS. 10(A), 10(B), 10(C), 10($C_1$), 10(D) and 10(E) is a flow chart for the development of an ARIMA model.
Figure 10B:
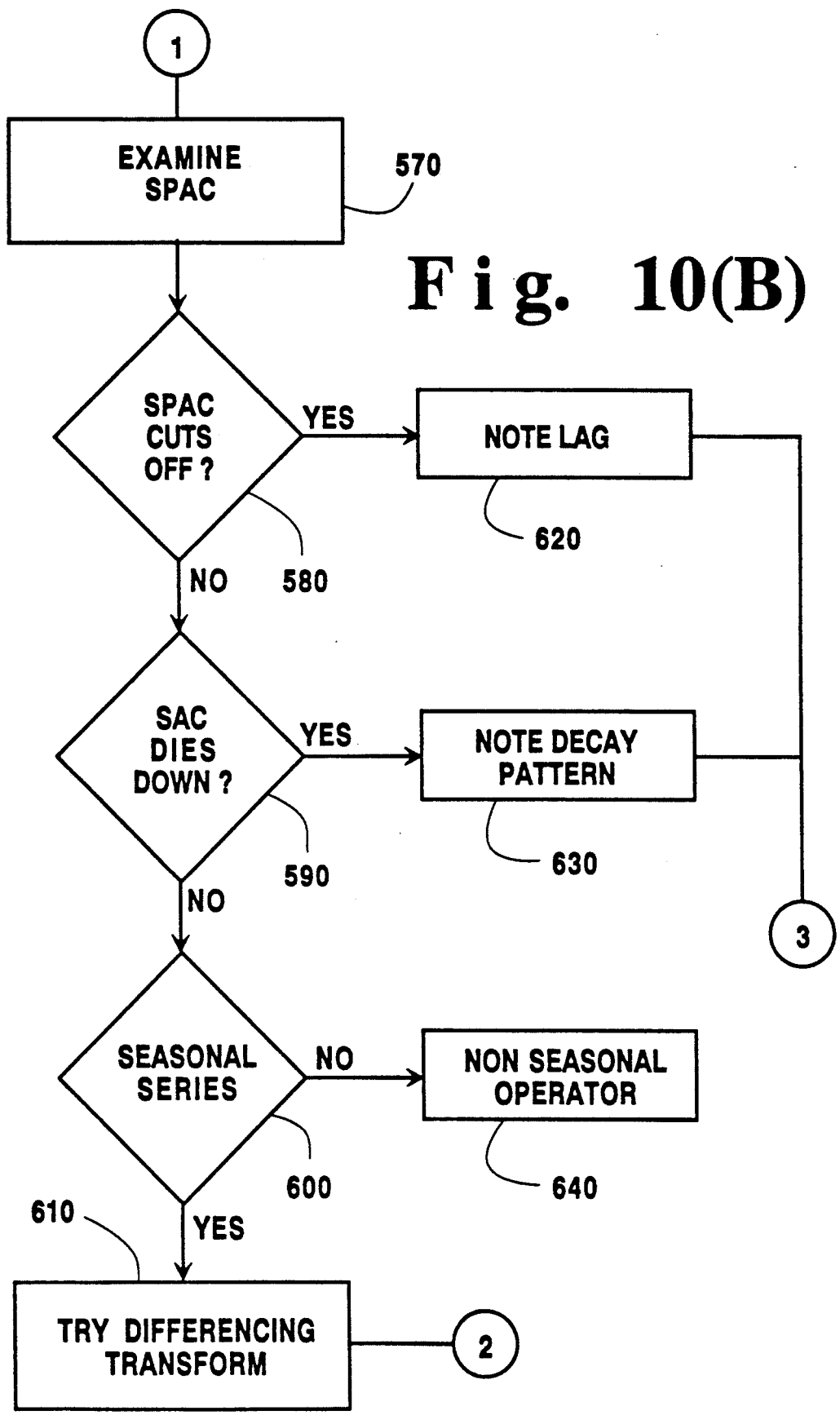
Figure 10D:
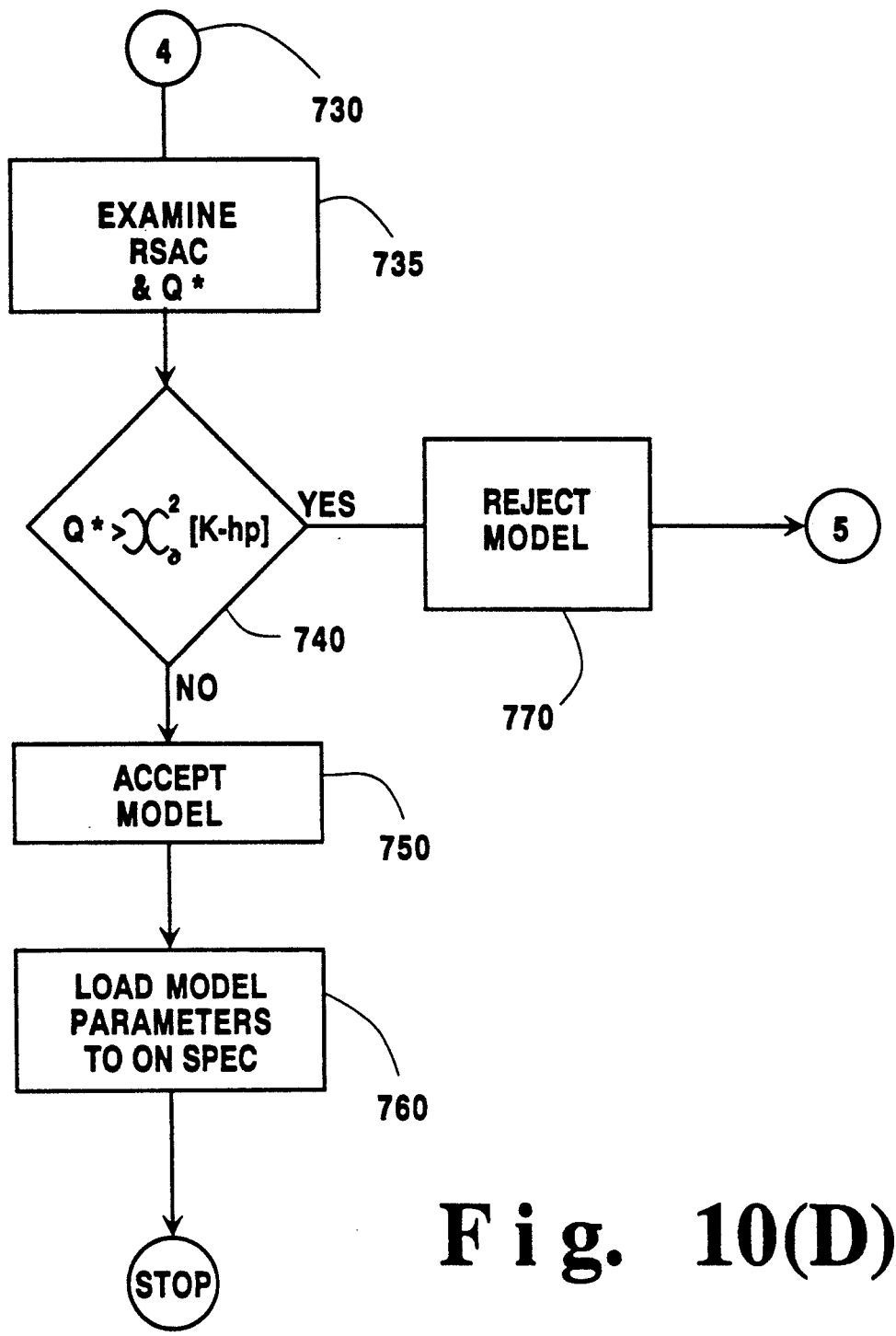
Figure 10E:
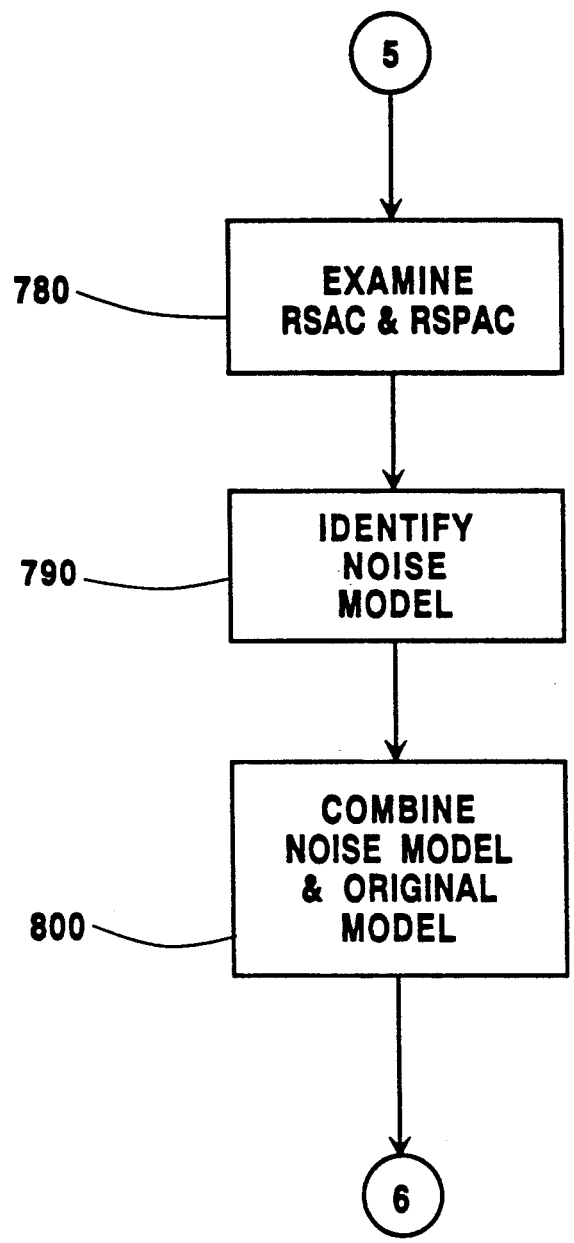

When the new observation $Y_{t+1}$ is available, a residual ($\hat{Y}_t - Y_{t+1}$) is calculated and this residual is control charted using traditional Shewhart methodology. The impact of this approach can be seen by comparing FIGS. 6 and 9. FIG. 6 is a control chart with limits set up in the manner described above using the PDF for a particular variable. FIG. 9 is the ARIMA-based residual control chart at the same level of Type I error. The ARIMA-based residual control chart of FIG. 9 shows a process that is clearly operating with only common-cause variation. With the customized statistical tests for trend length and knowledge of the impact of diurnal variation on this process variable, the same conclusion would be reached through a much less direct approach.

Residual control charts such as FIG. 9 based on ARIMA models are generated on line and automatically created based on the data processing frequency of the system. Data used for ARIMA Modeling are typically not subgrouped since subgrouping is appropriate when multiple measurements of a process variable can be made essentially instantaneously. Using the ARIMA model gives two advantages; it provides a quantitative estimate of where the process will be, as opposed to a direction or general location and, it is consistent. Given the same history it will always predict the same outcome.

A more detailed disclosure of development of an ARIMA Model is shown in the flow charts of FIG. 10(A)–(E) and the following description. A data set of historical process variable data is selected for analysis at 500, typically the basis data set normally used to establish control limits. It should cover several integer multiples of any known periodic disturbances that are typically part of the process, e.g. instrument servicing. These data are put into the form of a time series, which is the natural form in which they are obtained. The sample autocorrelation function (SAC) and the sample partial autocorrelation function (SPAC) for the time series are calculated at 510 and 520 using the off-line computer 120 under program control e.g. SAS.

SAC is examined at 520, 530, 540, 545, 550 and 560. The behavior of the SAC is studied at 550 and 560 for evidence that it either cuts off quickly (530) or dies down quickly (540), which would indicate that the series is stationary. If the series exhibits either type of behavior, the lag, i.e. interval at which the event is defined is noted at 550, and the nature of the decay at 560 (if any), and the procedure is continued at 570 as described hereinbelow. If the series exhibits neither behavior, i.e., if SAC is not cutting off at 530 or is not dying down quickly at 540, the series cannot be considered stationary and a differencing transformation 545 may be used to obtain a stationary series. Typically a linear first or second difference will induce stationarity in a non-seasonal series. The methodology for this and the calculation of SAC & SPAC can be found in "Time Series Analysis: forecasting and control" by G. E. P. Box and G. M. Jenkins, revised edition, 1976 Holden Day.

With the achievement of a stationary series SPAC is examined at 570, 580, 590, 600, 610, 620, 630 and 640. The SPAC is also studied for the above-noted types of behavior, i.e., cutting off or dying down quickly, and for indication of seasonality. Items 580, 590, 620, and 630 are analogous to items 530, 540, 550 and 560, respectively on FIG. 10A. Seasonality is detected in item 600. If no seasonality is present, item 640 tells the modeler that there is no nonseasonal operator that will produce stationarity. Difference transformation in item 610 can be used to induce stationarity as described above, if the series exhibits seasonality in item 600.

The combined behavior of the SAC and SPAC for the developed stationary series is then used at 645 to identify the form of the ARIMA model at 650, 660, 670 and 688 in 10(c).

The form of the model is shown for the various combinations of SAC and SPAC behavior at 650, 660, 680. If SAC cuts off and SPAC dies down, a model at 650 is used. If SAC dies down and SPAC cuts off, a model at 660 is used. If SAC and SPAC cut off, a model at 660 or 650 may be used, depending on whether SAC cuts off first. If SAC and SPAC die down, a model at 680 may be used.

With reference to FIG. 10(C), the general form 690 of the ARIMA model is described in (p,d,q) where p is the order of the autoregressive portion, d is the degree of differencing, and q is the order of the moving average portion in accordance with standard time series nomenclature and usage.

For the model estimation at 700 parameters of the model are found in the estimation step using conventional methodology for parameter estimation, e.g. conditional least squares, maximum likelihood. Off-line computer 120 (FIG. 2) under program control, e.g. SAS accomplishes this step. The output is in the form of estimates of the value of the coefficients in the model and the model constant term. Statistics describing the estimation results are also provided for diagnostic use.

Since parsimony is one characteristic of a good time series model, the t-values of each parameter estimated are examined at 710 and then at 720 for the hypothesis test that the parameter value is statistically different from zero. If not, it is eliminated from the model form at 725 and the estimation step repeated. If yes, it is directed to item 730.

RSAC and the Box-Ljung statistic are examined at 735 for information pertinent to the decision of whether the model is acceptable on an overall basis. If the Box-Ljung statistic is greater than the critical chi-squared value at 740, the model is rejected at 770. If not, the model is accepted at 750 and loaded at 760. A rejected model at 770 can be improved by examining the RSAC, residual sample autocorrelation function as described below.

A rejected model can be improved by identifying a noise model from the RSAC and RSPAC as indicated at 780, 790 and 800. RSAC and RSPAC are examined at 780 and the structure of the noise model is identified at 790.

The noise model and original models are combined at 800 into one general ARIMA form and reestimated. This process is repeated until an acceptable, parsimonious model is attained. An accepted model form and its parameter values are installed in the database 160 (FIG. 2) for use in on-line calculation as above described.

Figure 11:
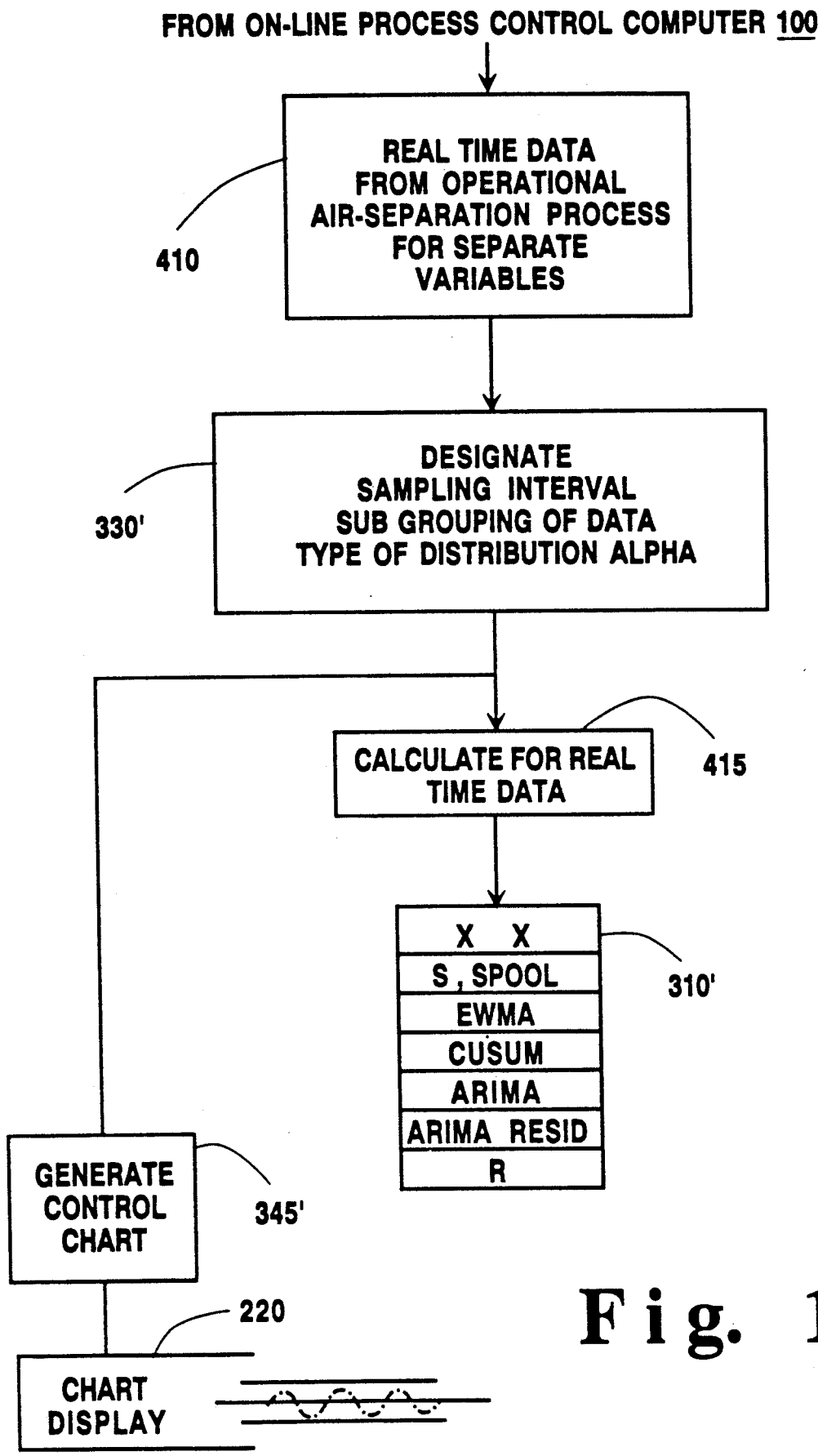
FIG. 11 is a flow chart for on-line operation of a system in accordance with the present invention.

Normal distribution is presumed since the residuals from the correct ARIMA model should form a normally distributed white noise sequence. Limits, alarms and models described above are established in the data base 160 and in SPC processor 200 and operation of the control system of the present invention can proceed. With reference to the flow chart of FIG. 11, real time data from an operational air separation process, for separate variables, e.g. items A–P listed hereinabove is obtained at 410 from process control computer 100 (FIG. 2) and as shown in FIG. 10, processed at 415, 310', 345' to obtain chart displays at 350, in the form described hereinabove, from which the alarms can be detected by an SPC operator. In the flow chart of FIG.

11, real time data are organized at 330' by forming subgroups as described hereinabove and the following are calculated at 310':

A mean is calculated for each subgroup, $\overline{X}$, and for the entire basis data set, $\overline{\overline{X}}$;

A standard deviation and variance are calculated for each subgroup, and for the pooled data of the basis set;

An exponentially weighted moving average (EWMA) is calculated for the subgroup mean;

A cumulative sum (CUSUM) is calculated.

The predefined ARIMA model is used with the current data to make forecasts of one step ahead for control chart use and several steps ahead as a visual aid to the SPC operator and process control purposes;

The residual value (the difference between the current measured value and the one step ahead forecast made one step earlier) is calculated. The residual time series will be random, independent and normally distributed if the process is in statistical control and the underlying ARIMA model is correct. If not the conventional Shewhart rules will indicate special cause;

A subgroup range is calculated along with the average range for the basis data set;

As the calculated values become available, they are plotted on the corresponding control chart automatically.

The following is a hypothetical description of a particular application of the present invention for to a specific process variable, with reference to FIGS. 12, 13 and 14. FIG 12 is a CRT screen 1000 generated by an application of the program control to receive inputs from the SPC operator and to display these inputs concurrently with calculated statistical relationships generated by program control. FIG. 13 shows operator inputs to screen 1000 and FIG. 14 shows additionally the calculated statistical relationships.

| | ENTER |
|---|---|
| 1001' - Tag Name | Identification of process variable - in this example it is the purity of the oxygen product designated "LO2 PUR" (item L of FIG. 1). |
| 1002' - Max. Sample No. | The number of samples, typically 5–50 (subgroup number) to be used for on-line analysis based on observations 1008', 1010'. |
| 1004' - Sample Interval | The time period between each successive sample, e.g. from 5 seconds to 24 hours. |
| 1008', Observation Number | The number of data observations to be made on-line in the time period of the Observation Interval e.g. (2) observations in (2) minutes; the (2) observations are averaged ($\overline{X}$) and constitute a sample (one of the (50) designated at 1002') |
| 1010', Observation Interval | |
| 1012' - Chart Type | Control Chart type is menu - selected from: <br> (1) $\overline{X}$ <br> $\underline{X}$ and Rm <br> (2) $\overline{X}$ and S <br> (3) Xma and Rm <br> (4) Xma and S$\underline{m}$ <br> In this example $\overline{X}$ and S are selected. This setting directs the computer under program control to calculate upper and lower control limits, center line for the previously set variable at 1001' using PDF for the historical data for this variable in the data base 400 (FIG. 2) using the previously set sample number (1002') and sample interval |

Figure 4:
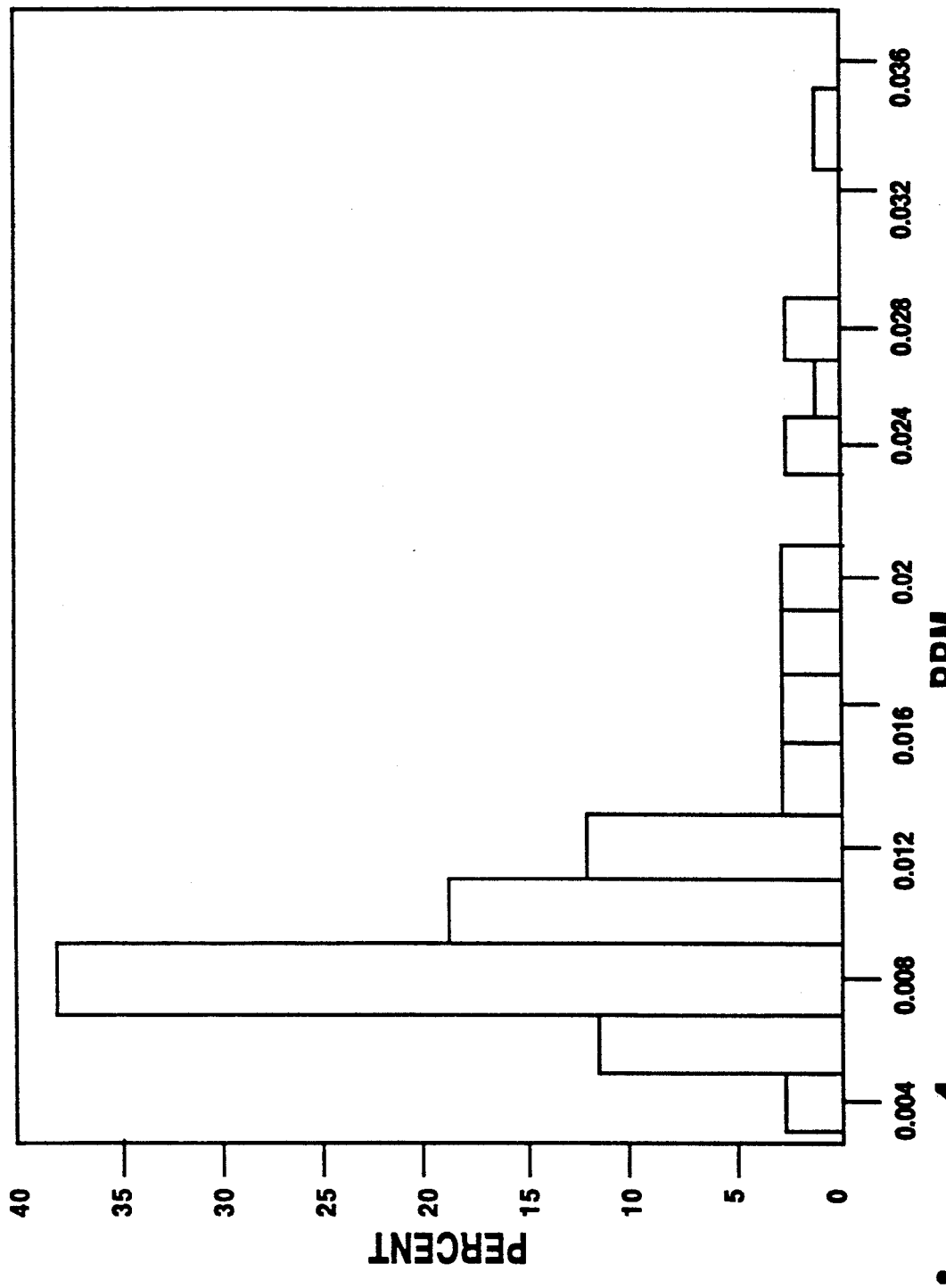
FIG. 4 is an example of a histogram generated in the course of practicing the present invention.
Figure 5:
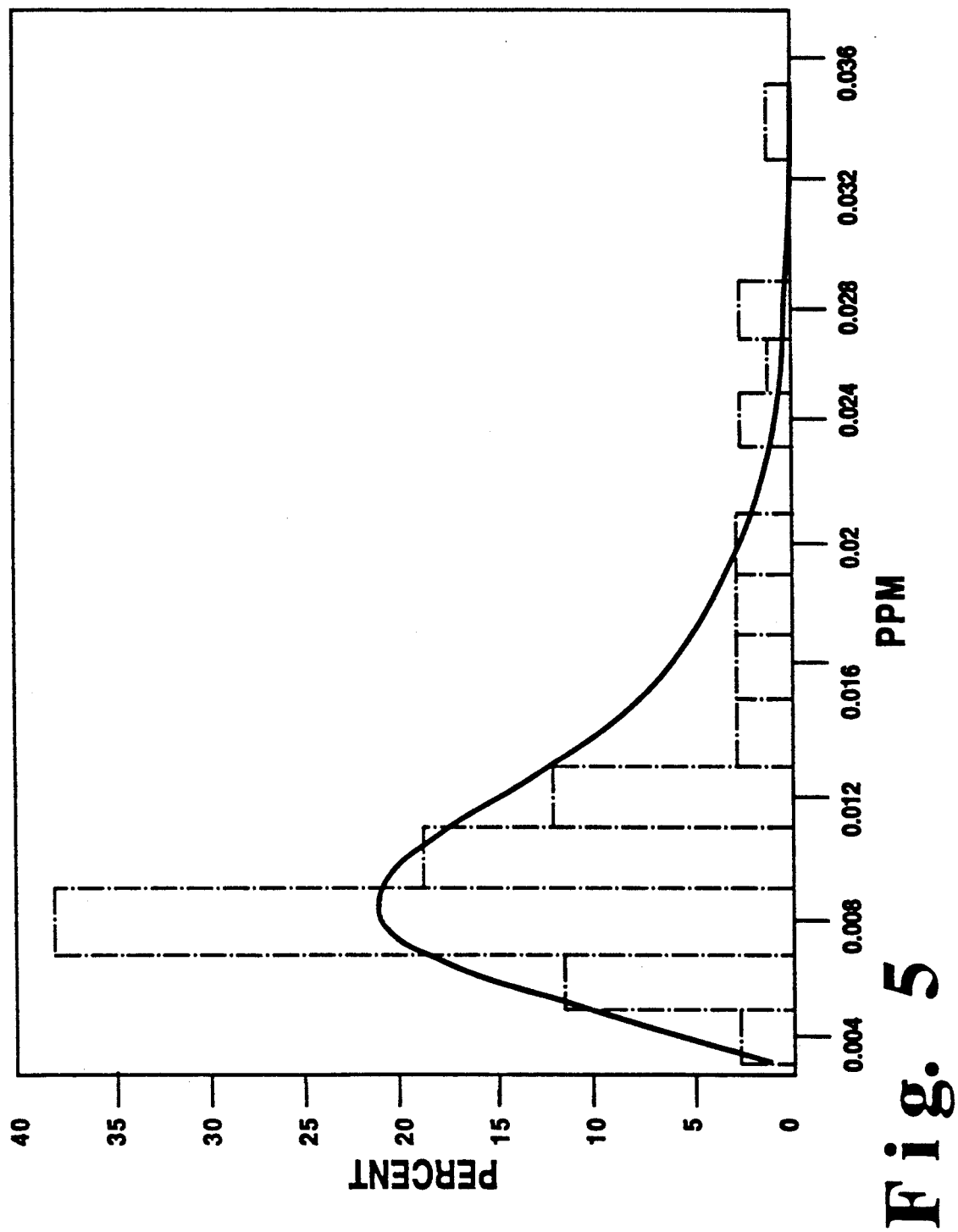
FIG. 5 is a plot of a distribution form applicable to the histogram of FIG. 4.

| | -continued |
|---|---|
| | ENTER |
| | (1004') and confidence level (alpha) settings (1022', 1024') described below. |
| 1014' - Distribution | Distribution is menu selected from: <br> Normal <br> Log Normal <br> Binomial <br> Poisson <br> Quantile <br> In this example "log normal" is selected which is illustrated in FIG. 4 which is a histogram of historical data. This setting directs the computer under program control to calculate the probability density function (PDF) for the previously set distribution type (1014') for the previously set variable (1001') using historical data for this process variable which is in data base 160 (FIG. 3) using previously set sample number (1002') and sample interval (1004'). The PDF is used as the basis for calculating control limits given a Type I (alpha) error, i.e., confidence level, set at 1022', 1024' noted below. |
| 1016', moving average size, 1018', upper specification limit 1020', lower specification limit 1022', 1024' - Alpha U, Alpha L | These settings are the probability of making a Type I error (confidence level) and are used to obtain control chart limits. Typical setting is between 0 and 0.25. In this example the Alpha L is set at 0.025 for the lower control chart limit and at 0.05 for Alpha U, the upper control chart limit; These settings are utilized in the computer calculation of control chart limits from integration of the PDF. |
| 1050' - Trend Lags Alpha | This setting is the confidence level for the determination of the trend length and is set at a value between 0.01 and 0.25; for the example of FIG. 8, alpha for the trend is set at 0.05 (the calculated trend threshold is "12" as shown at FIG. 8) and this value is stored in data base 160 (FIG. 3). |

With the above-indicated settings in-place, as indicated in FIG. 13, the computer under program control will calculate and display the following as illustrated in FIG. 14:

| 1026'; 1028', 1032' | The Upper Control Limit (1026'), the Lower Control Limit (1032') and the center-line (1028') for $\overline{X}$ chart and value displayed (chart selection was "2" designating $\overline{X}$ and S). |
|---|---|
| 1034', 1036', 1040' | The Upper Control Limit (1036'), the Lower Control Limit (1040') and the center-line (1034') for "S" chart (standard) is calculated and displayed. |

Note that non-prime reference numerals 1001 to 1040 correspond to prime reference numerals 1001' to 1040' except that the non-prime reference numerals refer to the location on the screen rather than to actual entries Note that non-prime reference numerals 1001 to 1040 correspond to prime reference numerals 1001' to 1040' except that the non-rime reference numerals refer to the location on the screen rather than to actual entries. Upon establishment of the control chart parameters as hereinabove described, real-time samples for the designated process variable are collected and displayed on the selected control charts as shown in FIGS. 15 and 16.

Figure 15:
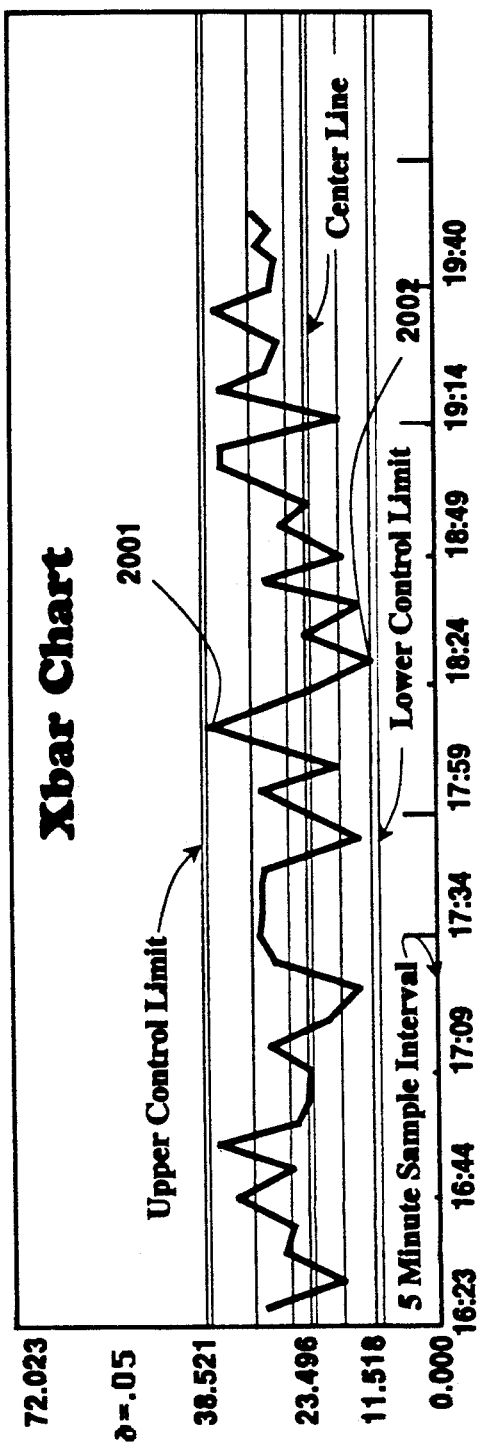
FIGS. 15, 16, 17, 18 show control charts generated in conjunction with the use of the CRT screens of FIG. 12-14.
Figure 16:
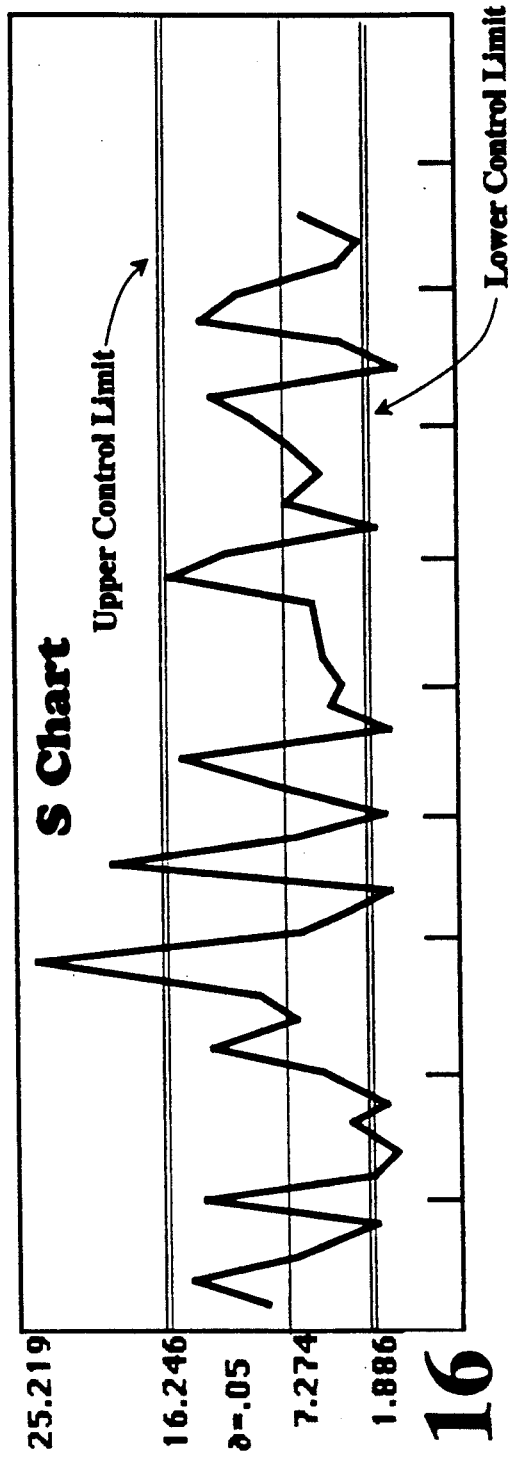

FIGS. 15 and 16 show that the designated variable is in statistical control. The samples 2001 and 2002 of the X-Bar chart of FIG. 15 would result in an alarm since the thresholds of the upper and lower control limits were attained. This does not indicate that the process is out of statistical control but the situation should be investigated; at an alpha of 0.05 there is a 5% chance that this is false information. Samples 2004 through 2024 each represents a point which exceeds the control limit for the S-chart.

In FIG. 6, an alarm is produced at 359 and 359' since control chart threshold limits are attained and an alarm is also produced at 347 where successive values (in this case 6) are all on one side (above or below the center line of the chart and exceed a predetermined experience based number e.g. (5), and could indicate the need for a set point adjustment.

Figure 17:
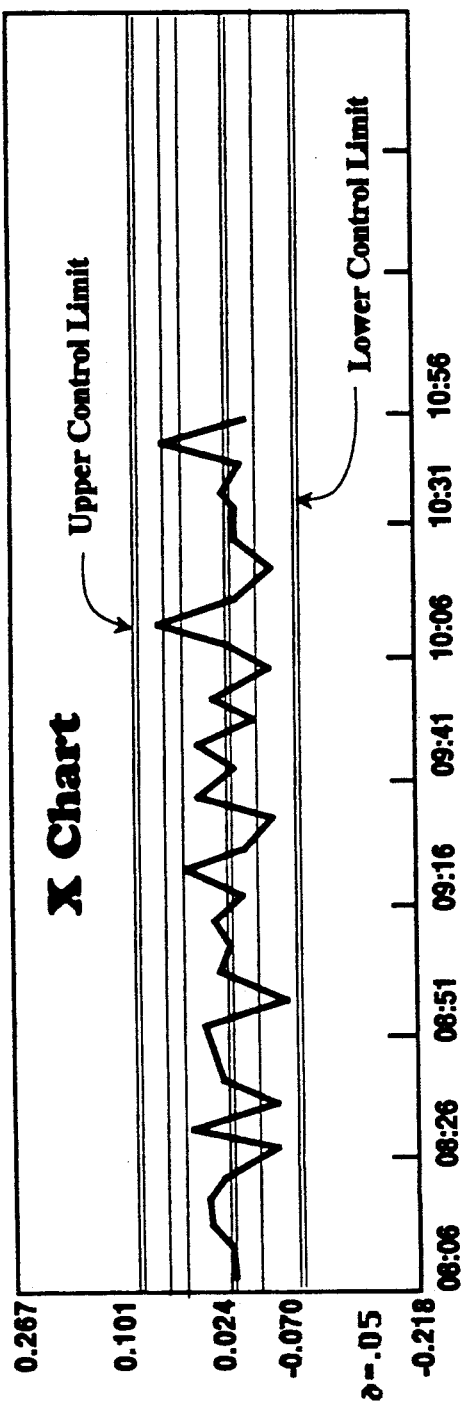

The selection of "ARIMA Residual" at 1052 of FIG. 14 commands the program controlled computer to generate on-line the residual of the on-line variable data and the ARIMA model for the selected variable (which was created and stored in Data Base 160 (FIG. 3)) as hereinabove described. The residual is exemplarily illustrated on the control chart of FIG. 17 which is based on the PDF calculated for the residual data, a normal distribution, and an alpha error (confidence level) in the range of 0 to 0.25. The plot of FIG. 16 shows standard individuals Shewhart Chart for ARIMA residuals in statistical control.

Figure 18:
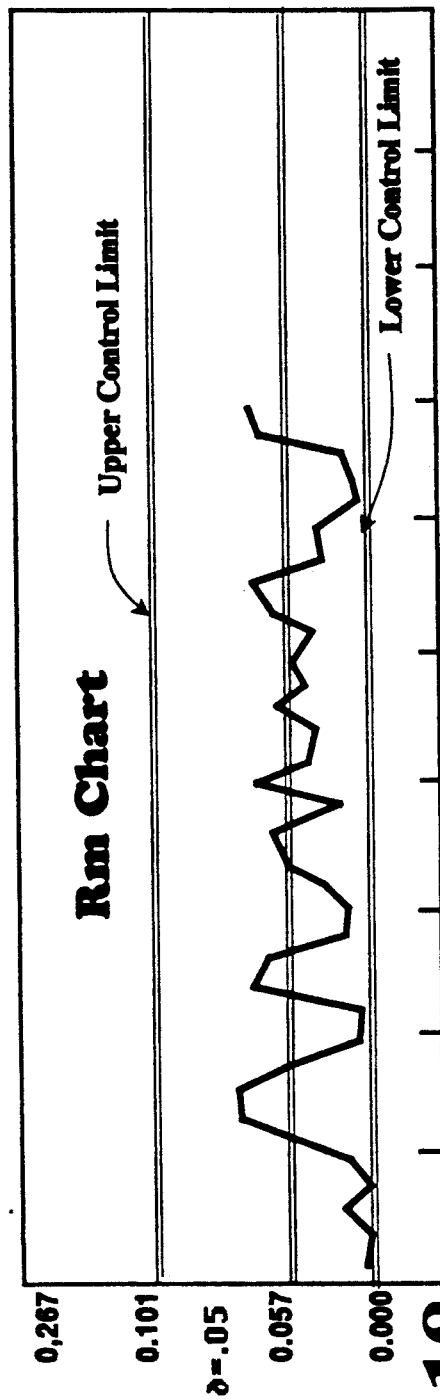

FIG. 18 is the Rm (moving range) chart created for the same observations.

In the event of the detection of special cause variation, such as indicated in the trend length AA-BB' of FIG. 7 the set point adjustment at 1060 of FIG. 12 can be used to provide a signal 103 from SPC computer 200 (FIG. 1) to the process control computer 100 raise or lower a set point for the particular process variable.

What is claimed is:

1. Statistical process control method for an air separation process for the production of one or more constituents of the air feed to the process wherein historical data for each of a plurality of pre-determined process variables of said process is electronically available, said method comprising:
   (i) providing computer means under program control;
   (ii) computer generating with said computer means control chart parameters and alarm thresholds for a distribution type based on the probability density function (PDF) of said historical data for at least one of said process variables;
   (iii) providing an electronic data base interactive with said computer means and storing said control chart parameters in a data file of said data base;
   (iv) storing in a data file of said data base continuous data for at lest one of said process variables in a time series of predetermined data sample groups;
   (v) computer generating with said computer means alarm criteria based on said control chart parameters;
   (vi) storing said alarm criteria in a data file of said data base;
   (vii) computer generating with said computer means a stationary auto-regressive integrated moving average (ARIMA) type series model based on said time series of predetermined data sample groups stored in a data file of said data base for calculating a forecast of the variable data;
   (viii) storing said ARIMA model in a data file of said data base;
   (ix) computer generating on-line with said computer means the residuals of real-time process variable data from said air-separation process on-line for said at least one of said process variables and the forecast of the variable data from said ARIMA model;
   (x) computer generating on-line with said computer means a control chart based on said residuals, said alarm criteria and said forecast;
   (xi) computer generating the trend of a predetermined number of said residuals of consecutive variable data values on-line with said computer means and displaying said trend on said control chart; and
   (xii) computer generating a visual display of an alarm indication on-line with said computer means based on said alarm criteria when the trend for a predetermined number of said residuals for consecutive variable data values continuously increases or continuously decreases.

2. Improvement in accordance with claim 1 wherein said computer means generates a control chart which displays said parameters and values based on observations of real-time data for at least one of said process variables.

3. Improvement in accordance with claim 1 wherein said control chart parameters are stored in said electronic data base.

4. Improvement in accordance with claim 1 wherein historical data for each of a plurality of pre-determined process variables is electronically collected for at least one (1) twenty-four hour period for one or more of each such variable.

5. Improvement in accordance with claim 1 which comprises the additional steps of computer generating a histogram of said time series with said computer means and determining from said histogram a designation for a distribution form of the time series of said histogram.

6. Improvement in accordance with claim 1 wherein said air separation process is under control of a process control computer which utilizes at least one electrically controlled set point to adjust at least one control device of said process and wherein said method includes the step of computer generating an electrical signal which is communicated to said process control computer to adjust at least one said electrically controlled set point when an alarm threshold is attained.

7. Improvement in accordance with claim 1 wherein an electronic data base interactive with said computer means is provided for electronically storing in a data file thereof continuous historical data for said plurality of pre-determined process variables.

8. Improvement in accordance with claim 7 which includes the step of electronically storing in a data file of said data base continuous data for one or more air separation process variables in a time series of predetermined data sample groups.

9. Improvement in accordance with claim 8 which includes the step of computer generating a histogram of said time series with said computer means.

10. Statistical process control method for an air separation process for the production of one or more constituents of the said feed for the process wherein the process has been running acceptably for a relatively long period of time so that historical data for each of a plurality of pre-determined process variables of said process is electronically collectable, the said method comprising:

(i) providing computer means for on-line and off-line computation under program control and an electronic data base interactive with said computer means;

(ii) electronically storing in a data file of said data base continuous historical data for one or more air-separation process variables in a time series of predetermined data sample groups;

(iii) computer generating with said computer means control chart parameters corresponding to a distribution type based on the probability density function (PDF) of said time series of said historical data stored in a data file of said data base and a designated confidence level;

(iv) storing said control chart parameters in a data file of said data base;

(v) observing and processing real-time variable data from said air-separation process on-line with said computer means and displaying observations of said real-time data on a control chart together with said control chart parameters;

(vi) computer generating the trend of a predetermined number of such observations for consecutive, on-line variable data values with said computer means and displaying said trend on said control chart; and (vii) computer generating a visual display of an alarm indication on-line with said computer means when said trend for a predetermined number of real-time values for consecutive variable data values continuously increases or continuously decrease beyond said control chart parameters.

11. Statistical process control method for a separation process for the production of one or more constituents of the air feed to the process wherein the process has been running acceptably for a sufficiently long period of time so that data for each of a plurality of pre-determined process variables is electronically collectable, said method comprising:

(i) providing computer means for off-line and on-line computation under program control and an electronic data base interactive with said computer means;

(ii) electronically storing in a data file of said data base continuous data for one or more air separation process variables in a time series of predetermined data sample groups;

(iii) computer generating a histogram of said time series of predetermined data sample groups with said computer means;

(iv) determining from said histogram a designation for a distribution form of the time series of said histogram;

(v) computer generating with said computer means control chart parameters corresponding to said distribution form based on the probability density function (PDF) of said time series of predetermined data sample groups stored in a data file of said data base and a designated Type I error;

(vi) storing said control chart parameters in a data file of said data base;

(vii) computer generating with said computer means alarm criteria based on said control chart parameters stored in a data file of said data base;

(viii) storing said alarm criteria in a data file of said data base;

(ix) computer generating with said computer means a stationary auto-regressive integrated moving average (ARIMA) type series model based on said time series of predetermined data sample groups stored in a data file of said data base for calculating a forecast of the variable data;

(x) storing said ARIMA model in a data file of said data base; and (xi) observing and processing real-time variable data from said air separation process on-line in said computer means and displaying observations of said real-time data on a control chart together with said alarm criteria based on said control chart parameters and said forecast of the variable data from said ARIMA model.

* * * * *